US012637109B1

(12) United States Patent
Matlack et al.

(10) Patent No.: US 12,637,109 B1
(45) Date of Patent: May 26, 2026

(54) DETERMINING ERROR EVENT LIKELIHOODS FOR VEHICLE ROUTES AND ROUTE PATHS

(71) Applicant: GM Cruise Holdings LLC, San Francisco, CA (US)

(72) Inventors: Charles Bruce Matlack, Seattle, WA (US); Yanni Cao, San Mateo, CA (US); Mamoon Masud, Austin, TX (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 379 days.

(21) Appl. No.: 18/353,738

(22) Filed: Jul. 17, 2023

(51) Int. Cl.
| | |
|---|---|
| *B60W 60/00* | (2020.01) |
| *B60W 50/02* | (2012.01) |
| *B60W 50/00* | (2006.01) |

(52) U.S. Cl.
CPC .. *B60W 60/00186* (2020.02); *B60W 50/0205* (2013.01); *B60W 2050/0075* (2013.01); *B60W 2556/50* (2020.02)

(58) Field of Classification Search
CPC ....... B60W 60/00186; B60W 50/0205; B60W 2050/0075; B60W 2556/50
See application file for complete search history.

(56) References Cited

U.S. PATENT DOCUMENTS

| | | | |
|---|---|---|---|
| 11,318,959 B2 | 5/2022 | Finn et al. | |
| 11,685,408 B1 * | 6/2023 | Zhao ................... | B60W 60/005 |
| 2018/0004211 A1 * | 1/2018 | Grimm ................ | G05D 1/0214 |
| 2025/0035457 A1 * | 1/2025 | Zhang ................ | G01C 21/3617 |
| 2025/0065894 A1 * | 2/2025 | Luo ........................ | B60W 50/06 |

FOREIGN PATENT DOCUMENTS

EP 3919866 A1 * 6/2020 ............. G01C 21/34

* cited by examiner

*Primary Examiner* — Russell Frejd
*Assistant Examiner* — Brittany Renee Peko
(74) *Attorney, Agent, or Firm* — CANTOR COLBURN LLP

(57) ABSTRACT

Systems and techniques are provided for determining error event likelihoods of routes of an autonomous vehicle (AV). An example method can determine, for each route from a plurality of routes, a respective set of route paths for the route, each route located within a geofence; determine, for each route path of each route, a first respective likelihood that the AV will use the route path for the route; determine, for each route path of each route, a second respective likelihood that the AV will encounter an error event along the route path during an autonomous operation; determine, for each route path of each route, an overall error event likelihood based on the first and second respective likelihoods for each route path of that route; and determine an aggregated error event likelihood for each route based on the overall error event likelihood of each route path of that route.

18 Claims, 10 Drawing Sheets

400

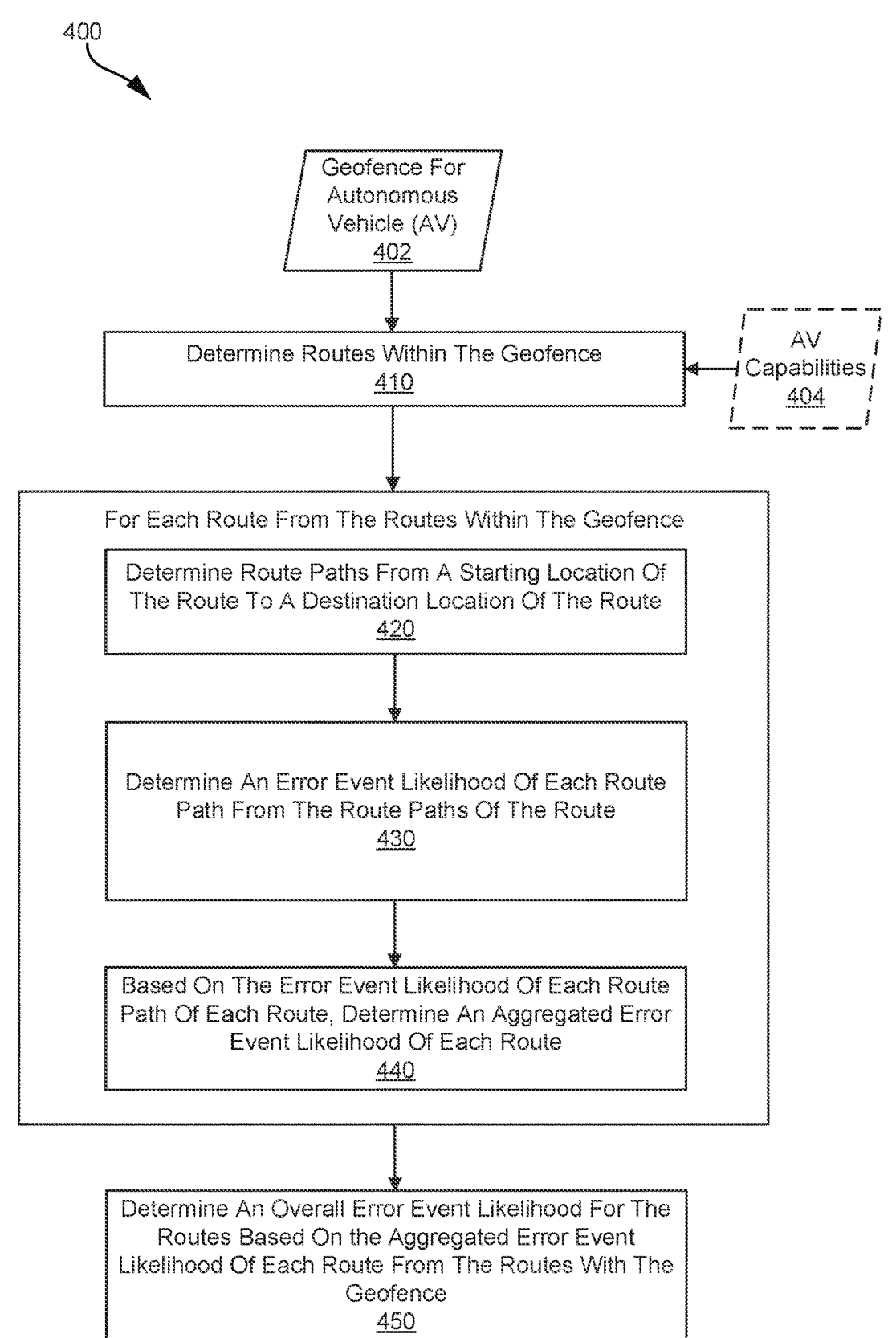

Geofence For
Autonomous
Vehicle (AV)
402

Determine Routes Within The Geofence
410

AV
Capabilities
404

For Each Route From The Routes Within The Geofence

Determine Route Paths From A Starting Location Of
The Route To A Destination Location Of The Route
420

Determine An Error Event Likelihood Of Each Route
Path From The Route Paths Of The Route
430

Based On The Error Event Likelihood Of Each Route
Path Of Each Route, Determine An Aggregated Error
Event Likelihood Of Each Route
440

Determine An Overall Error Event Likelihood For The
Routes Based On the Aggregated Error Event
Likelihood Of Each Route From The Routes With The
Geofence
450

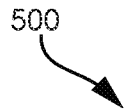

For Each Route Path From The Route Paths Of The Route, Determine A Respective Likelihood That The AV Will Use The Route Path To Traverse The Route
510

Based On The Scene Features Of Each Route Path From The Route Paths Of The Route, Determine A Respective Error Event Likelihood Associated With Each Route Path
520

Based On The Respective Likelihood That The AV Will Use Each Route Path To Traverse The Route And The Respective Error Event Likelihood Of Each Route Path, Determine The Aggregated Error Event Likelihood Associated With The Route
530

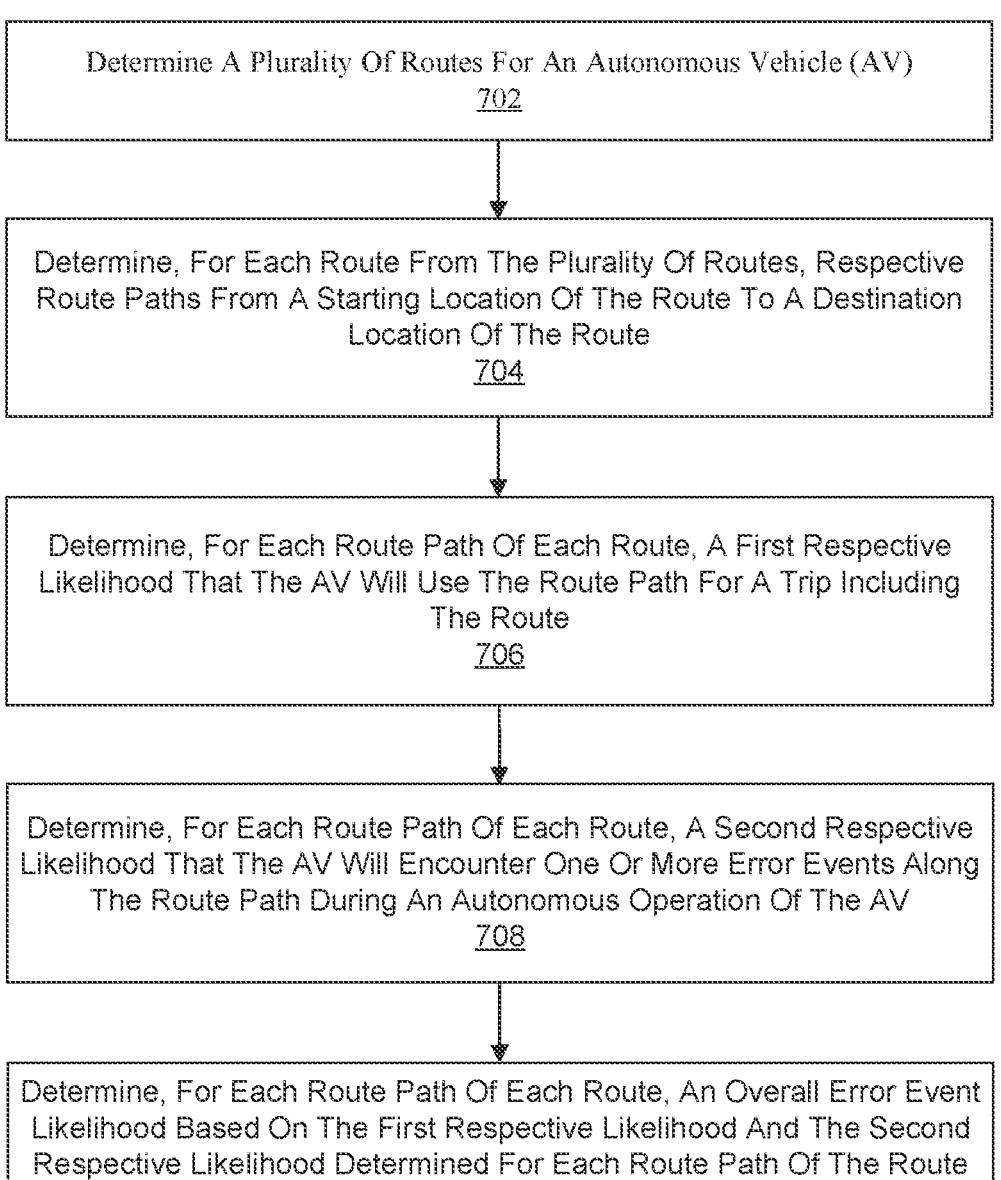

Determine A Plurality Of Routes For An Autonomous Vehicle (AV)
702

Determine, For Each Route From The Plurality Of Routes, Respective Route Paths From A Starting Location Of The Route To A Destination Location Of The Route
704

Determine, For Each Route Path Of Each Route, A First Respective Likelihood That The AV Will Use The Route Path For A Trip Including The Route
706

Determine, For Each Route Path Of Each Route, A Second Respective Likelihood That The AV Will Encounter One Or More Error Events Along The Route Path During An Autonomous Operation Of The AV
708

Determine, For Each Route Path Of Each Route, An Overall Error Event Likelihood Based On The First Respective Likelihood And The Second Respective Likelihood Determined For Each Route Path Of The Route
710

FIG. 7

DETERMINING ERROR EVENT LIKELIHOODS FOR VEHICLE ROUTES AND ROUTE PATHS

TECHNICAL FIELD

The present disclosure generally relates to determining error event likelihoods for vehicle routes. For example, aspects of the present disclosure relate to systems and techniques for determining route paths for a vehicle route and error event likelihoods for the route paths and the vehicle route.

BACKGROUND

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at specific locations on the autonomous vehicles.

BRIEF DESCRIPTION OF THE DRAWINGS

Illustrative examples and aspects of the present application are described in detail below with reference to the following figures:

FIG. 4 is a flowchart illustrating an example process for predicting error event likelihoods of vehicle routes within a geofence, according to some examples of the present disclosure;

FIG. 5 is a flowchart illustrating an example process for determining an aggregated error event likelihood of each route from multiple routes within a geofence, according to some examples of the present disclosure;

FIG. 7 is a flowchart illustrating an example process for determining error event likelihoods for vehicle routes and route paths, according to some examples of the present disclosure.

DETAILED DESCRIPTION

Figure 1:
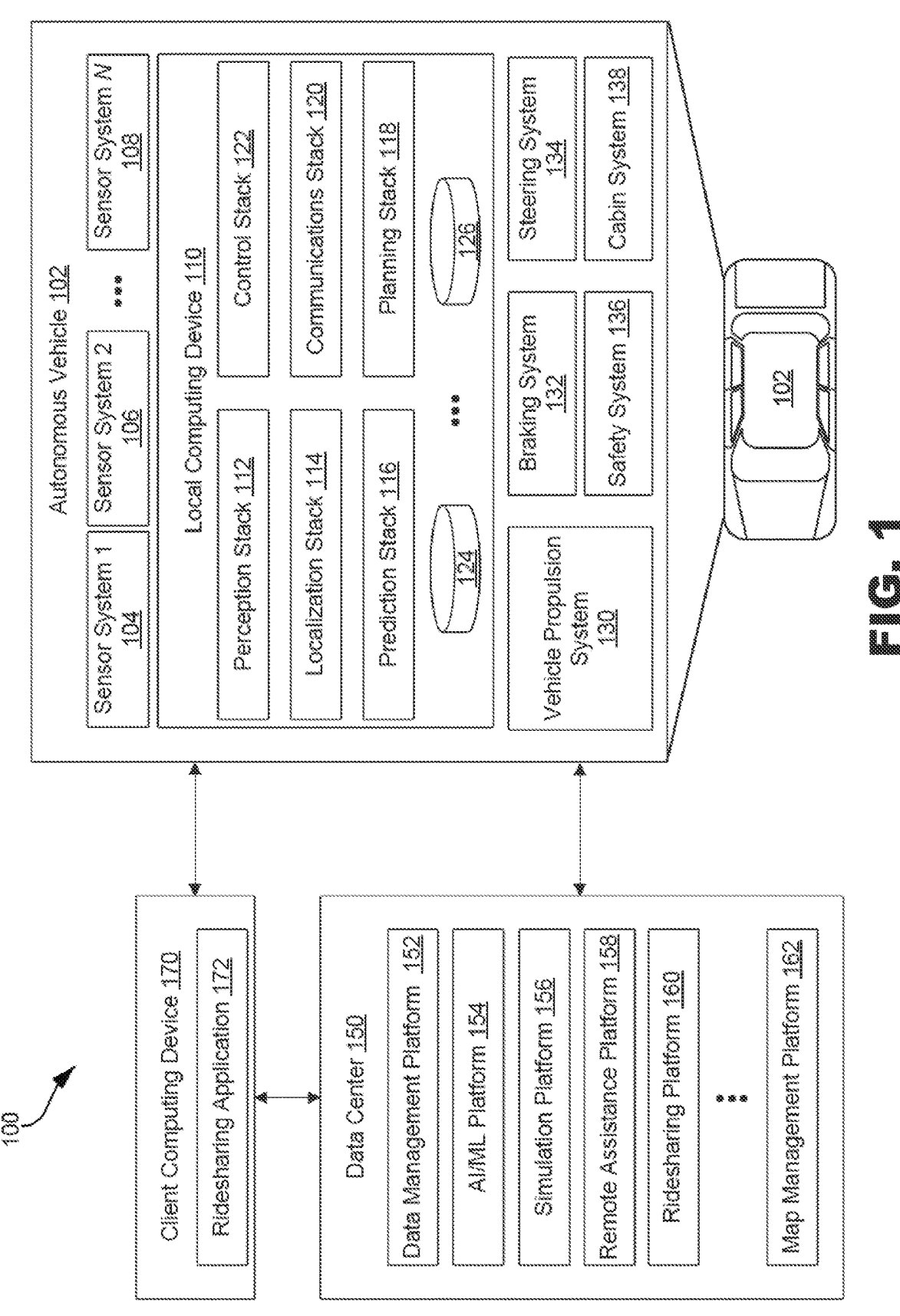
FIG. 1 is a diagram illustrating an example system environment that can be used to facilitate autonomous vehicle navigation and routing operations, according to some examples of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of aspects and examples of the application. However, it will be apparent that various aspects and examples may be practiced without these specific details. The figures and description are not intended to be restrictive.

The ensuing description provides aspects and examples of the disclosure, and is not intended to limit the scope, applicability, or configuration of the disclosure. Rather, the ensuing description of the aspects and examples of the disclosure will provide those skilled in the art with an enabling description for implementing an example implementation of the disclosure. It should be understood that various changes may be made in the function and arrangement of elements without departing from the scope of the application as set forth in the appended claims.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

As previously explained, autonomous vehicles (AVs) can include various sensors, such as a camera sensor, a light detection and ranging (LIDAR) sensor, a radio detection and ranging (RADAR) sensor, amongst others, which the AVs can use to collect data and measurements that the AVs can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. In some cases, an AV may operate based on or according to an operational design domain (ODD), which can include or provide a description of specific operating conditions in which the AV is designed to operate such as, for example and without limitation, roadway types, a speed range(s), environmental conditions (e.g., weather, illumination and/or visibility conditions, time-of-day such as daytime or nighttime, etc.), maneuvers, types of traffic conditions, maps and/or map regions, geographic areas, and/or other operating conditions.

An AV (and other types of vehicles) can have certain constraints and capabilities that affect how the AV behaves, what maneuvers the AV can perform (and/or the AV is allowed to perform), and/or even what contexts the AV can or is allowed to navigate. Given such constraints and capabilities of an AV, in many cases, the AV may behave different than a vehicle driven by a human, may have more constraints than a human driver, and may have less navigation options (e.g., maneuvers, operating conditions, etc.) or capabilities than a human driver. For example, an AV may not be able to navigate certain scene features or in certain contexts that a human driver may otherwise be able to navigate. Moreover, depending on the constraints and capabilities of the AV, the AV may have fewer options than a human driver when navigating certain scenes or encountering certain scene features or contexts. To illustrate, a human driver may be able to navigate certain contexts like construction zones that an AV may not be able to navigate or may have more limited ways to navigate. To further illustrate, a human driver may have greater flexibility in how (or whether) to handle certain merge maneuvers and lane changes, or may have additional options than an AV for handling situations where a merge maneuver is not timely completed or the vehicle is in a lane that prevents the vehicle to perform a scheduled or necessary maneuver.

For example, in some cases, if a vehicle that needs to continue straight through an intersection is not able to timely change from a lane that requires the vehicle to turn at the intersection (e.g., a left-turn only lane) to a lane that allows the vehicle to continue straight through the intersection, the vehicle (or a person in the vehicle such as a driver or passenger) may detect that it needs to continue straight through the intersection but is in a lane that requires the vehicle to turn. In this example, the vehicle may determine that it failed to timely change to the lane that allows the vehicle to continue straight through the intersection and may thus need to perform a reroute or, in some cases, may become stuck at the intersection in a state where the vehicle is in a lane that does not allow the vehicle to continue along the planned route or perform the maneuver that the vehicle would need to perform to continue along the planned route. If the vehicle becomes stuck, the AV may need to request assistance from a human, such as a remote operator if the vehicle is an autonomous vehicle. Accordingly, as shown, the vehicle may encounter an error event, such as the reroute or the stuck scenario including the need for human assistance. On the other hand, in some cases involving a vehicle and a human driver, the human driver may be able to perform a maneuver in the intersection to continue straight through the intersection rather than turning at the intersection (e.g., rerouting) or becoming stuck in need of remote assistance.

As a result of the various constraints and capabilities of an AV (or any other type of vehicle), the AV may be unable to autonomously complete certain maneuvers in a scene or autonomously navigate through certain contexts or scene features along a route. Instead, the AV may need to perform a reroute or request human assistance. In such situations, the AV may encounter or experience an error event. An error event can be generated when an AV needs to change its planned route (e.g., needs to reroute) or needs human assistance (e.g., from a remote operator) as a result of a scene feature (e.g., a condition, a context, an environment, etc.) encountered by the AV along a route, a capability (and/or limitation) of the AV in a particular scene or context, a failure experienced by the AV (e.g., a failure to complete or perform a maneuver, a failure to continue along a route or path, etc.), a state of the AV (e.g., a stuck state, etc.) that may require human assistance (e.g., as a result of a traffic constraint, an AV constraint, an inability to complete or perform a maneuver, etc.), an AV constraint in a particular scene or context, etc. For example, the AV may experience an error event when the AV encounters a scene feature that causes the AV to be rerouted to avoid or overcome the scene feature or otherwise causes a need for human assistance to address/handle the error event.

In some examples, an error event can include an event in which the AV may need human assistance to continue and/or perform a particular maneuver (and/or navigate a particular scene or scene feature), the AV experiences a navigation or operation error (e.g., a failure, etc.), the AV experiences a scenario in which the AV is unable to autonomously continue a route and/or maneuver through or around a scene or scene feature (e.g., a stuck scenario where the AV becomes stuck in a scene, etc.), the AV needs to perform a reroute, and/or the AV encounters a condition (e.g., an obstacle, a road hazard, a traffic condition, etc.) that the AV is unable to autonomously handle without rerouting to avoid the condition or without human assistance.

For example, an error event can include a reroute caused by certain contexts (e.g., scene features, maneuvers, etc.) that the AV is unable to handle or navigate but a human driver is otherwise able to handle or navigate, a human assistance state or request caused by certain contexts (e.g., scene features, maneuvers, etc.), and a particular AV state such as stuck state, among others. Non-limiting examples of situations and/or scene features that can cause error events for an AV can include intersection choke points (e.g., intersections where the AV has less maneuver/navigation options than a human driver because of the constraints and/or capabilities of the AV), failures to perform a lane change before reaching an end of a sink lane (e.g., a lane that the AV cannot exit without making a lane change), failures to perform a lane change before reaching a terminal lane or end of a sink superlane (e.g., a set of successive sink lanes that end in a terminal lane, which can include a lane whose only successor(s) is accessed via lane changes), a failure to perform a needed lane change(s) in a cascaded sink superlane (e.g., a sink superlane whose successor (e.g., via lane changes) is also a sink superlane), certain construction zones, certain merge areas, and certain road closures, among others.

An AV may often be unable to predict situations that may trigger an error event along a route, a geofence, and/or an ODD. For example, an AV may be unable to predict a location where the AV may encounter a scene feature that may cause the AV to become stuck, a scene feature along a route that may trigger a need for human assistance, and/or a scene feature along a route that may trigger a reroute. As a result, the AV may be unable to account for various scene features and maneuver execution failures (e.g., lane change failures, merge failures, intersection failures, construction zone navigation failures, etc.) associated with error events, that the AV may encounter along a route, geofence, and/or ODD. Moreover, the AV may be unable to predict an error event likelihood or rate associated with a route, geofence, and/or ODD. Developers may also be unable to determine how certain AV constraints, AV capabilities, and/or ODD changes (e.g., changes in ODD policies, conditions, avoidance areas, etc.) may affect an error event likelihood or rate of an AV in an ODD, geofence, route, etc.

Systems, apparatuses, processes (also referred to as methods), and computer-readable media (collectively referred to as "systems and techniques") are described herein for determining AV route and error event information such as route probabilities, error event probabilities, error event rates, etc. The systems and techniques described herein can determine various routes in a geofence and/or ODD, and the probabilities of an AV traversing different paths for a route (e.g., sub-routes). In some cases, the systems and techniques described herein can determine the probabilities for different paths of a route based on the AV capabilities, AV constraints, and/or scene features along the different paths. For example, the systems and techniques described herein can determine a threshold reroute probability caused by a scene feature along a path of a route. The scene feature can include a condition, context, constraint, obstacle, traffic rule, and/or road characteristic that may cause (and/or has a probability or threshold likelihood of causing) an error event for the AV.

In some cases, the systems and techniques described herein can determine a different path (e.g., a different sub-route or route branch) that the AV may traverse based on a threshold reroute probability along the path. For example, a threshold reroute probability can define a location along a path of a route that has a scene feature that may cause the AV to diverge into a different path (e.g., a different branch or sub-route) of the route. In this way, the systems and techniques described herein can determine various paths for a route (e.g., sub-routes or route branches) based on reroute probabilities, error events, and/or scene features along the route (and/or along each path).

In some cases, the systems and techniques described herein can determine different paths for a route and estimate probabilities of the AV traversing those paths during a trip associated with the route. For example, the systems and techniques described herein can determine that there are n number of paths that an AV can traverse from a beginning to an end of a route. The systems and techniques described herein can then determine a respective probability for each path from the n number of paths. The respective probability can represent that likelihood/probability that the AV may use the path to traverse the route. The systems and techniques described herein can determine path probabilities based on one or more factors such as, for example, reroute probabilities, scene features along the paths, trip simulations, prior trip statistics, AV constraints, AV capabilities, road conditions, ODD characteristics, and/or other information.

In some examples, the systems and techniques described herein can determine path probabilities based on any scene features (and/or number of scene features) along a path and/or associated reroute probabilities. The scene features can include obstacles, hazards, road conditions, traffic rules, scene contexts, scene characteristics, lanes, lane characteristics, types of roadways, segments of a road, and/or other conditions that may cause an AV to encounter an error event along a path(s). For example, the scene features can include lane change requirements, merge requirements, intersections (and/or intersection requirements/conditions), construction zones, road hazards, maneuver options and/or requirements, intersection choke points, sink lanes, sink superlanes, cascaded sink superlanes, merge areas, traffic rules, and/or other contexts and conditions that can cause (and/or have a probability and/or threshold likelihood of causing) an error event for an AV such as, for example and without limitation, an event triggering a reroute to a different path in order to avoid a scene feature, a stuck or failure state where the AV is unable to complete/continue a path or maneuver without human assistance, a situation in which the AV needs and/or requests human assistance to handle or avoid a scene feature, etc.

In some aspects, the systems and techniques described herein can determine the probabilities of different route paths that an AV may traverse and a respective error event likelihood (and/or error event probability) for each route path. For example, the systems and techniques described herein can determine the probabilities of different route paths based on estimated reroute probabilities, and the respective error event likelihood (and/or error event probability) of each route path based on certain scene features (and/or the number of such scene features) along each route path, such as scene features associated with error events (e.g., having a probability of causing an error event, known to cause an error event, estimated to cause an error event, etc.).

In some examples, an error event rate of a route path can be calculated based on a number of error events along the route path and another factor such as, for example, a distance of the route path or a number of events or scene features (or certain types of events or scene features) along the route path. For example, in some cases, the error event rate of a route path can be calculated based on the number of error events along the route path and a distance (e.g., in any unit) of the route path, such as a value indicating the number of error events along the route path over (e.g., divided by) a value indicating the distance of the route path. As another example, the error event rate of a route path can be calculated based on the number of scene features along the route path that are determined to cause error events (and/or having a threshold likelihood/probability of causing error events) over (e.g., divided by) a total number of scene features of one or more types that are along the route path.

Moreover, the systems and techniques described herein can determine an aggregated error event likelihood (and/or aggregated error event probability) for a route path based on the probability that the AV will traverse the route path when navigating the route and the respective error event likelihood determined for the route path. For example, to determine an aggregated error event likelihood for a route path, the systems and techniques described herein can multiply the probability that the AV will traverse the route path when navigating the route with the respective error event likelihood of the route path. The systems and techniques described herein can determine an overall error event likelihood (and/or error event probability) of a route based on the aggregated error event likelihoods of all of the route paths determined for that route. For example, the systems and techniques described herein can determine an overall error event likelihood (and/or error event probability) of a route by combining the aggregated error event likelihoods (and/or aggregated error event probabilities) of the route paths of the route. In some cases, the systems and techniques described herein can combine the overall error event likelihoods (and/or overall error event probabilities) of different routes within a geofence or ODD to determine an error event likelihood (and/or error event probability) for the geofence or ODD.

In some aspects, the systems and techniques described herein can use the error event likelihood (and/or error event probability) of a geofence or ODD to implement (or determine whether or how to implement) certain changes to an ODD, an AV constraint(s), and/or an AV capability. In some aspects, the systems and techniques described herein can use the error event likelihood (and/or error event probability) of a geofence or ODD to determine how certain changes to an ODD, an AV constraint(s), and/or an AV capability may affect an error event rate of the geofence or ODD; to prioritize (or deprioritize) certain changes to an ODD, an AV constraint(s), and/or an AV capability; to determine how (and/or whether) to modify an ODD, AV constraint(s), and/or AV capability; and/or to plan for certain changes to (and/or implementations of) an ODD, an AV constraint(s), and/or an AV capability.

For example, the systems and techniques described herein can use the error event likelihood and/or rate of an ODD to determine (or prioritize/deprioritize) changes to an ODD such as changes to operating conditions or avoidance areas defined by the ODD, to determine how certain changes to an ODD may impact an error event rate of the ODD, to determine (or prioritize/deprioritize) changes to a routing policy and/or routing constraint of the AV, to determine how certain changes to a routing policy and/or routing constraint of the AV may impact an error event rate of the ODD, to determine (or prioritize/deprioritize) changes to one or more AV capabilities (e.g., to AV software components that may impact a behavior of the AV, an AV maneuver capability, etc.), and/or to determine how certain changes to one or more AV capabilities may impact an error event rate of the ODD. This way, the error event rate (and/or error event probability) of an ODD can be used to make decisions about an ODD and/or properties of the ODD (e.g., a geofence, a route(s), an operating condition, a roadway, a restriction, a permission, an attribute, a rule, a requirement, etc.), an AV constraint(s), and/or an AV capability (e.g., a software capability, an AV functionality, a mechanical capability, a maneuver capability, an operating capability/functionality, etc.).

In some examples, the systems and techniques described herein can model how certain scene features (e.g., lanes, intersections, lane change areas, merge areas, construction zones, road closures, yield areas, intersection choke points, sink lanes, sink superlanes, cascaded sink superlanes, etc.) can cause error events such as lane change failures, merge failures, reroutes, human assistance requests/events, vehicle stuck situations, vehicle recovery events, operating failures, etc. In some cases, the systems and techniques described herein can model a relationship between certain error events and/or scene features. For example, the systems and techniques described herein can model how certain lane change failures and/or merge failures may cause reroutes and thus route path changes. In some aspects, the systems and techniques described herein can use predictive modeling to determine the impact of routing policy changes, AV constraint changes, AV capability changes, ODD changes, etc., and use such information to mitigate or avoid problems.

Examples of the systems and techniques described herein are illustrated in FIG. 1 through FIG. 8 and described below.

FIG. 1 is a diagram illustrating an example autonomous vehicle (AV) environment 100, according to some examples of the present disclosure. One of ordinary skill in the art will understand that, for the AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by sensor systems 104, 106, and 108. The sensor systems 104-108 can include one or more types of sensors and can be arranged about the AV 102. For instance, the sensor systems 104-108 can include one or more inertial measurement units (IMUs), camera sensors (e.g., still image camera sensors, video camera sensors, etc.), light sensors (e.g., LIDARs, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, time-of-flight (TOF) sensors, seat occupancy sensors, open/closed door sensors, tire pressure sensors, rain sensors, and so forth. For example, the sensor system 104 can include a camera system, the sensor system 106 can include a LIDAR system, and the sensor system 108 can include a RADAR system. Other examples may include any other number and type of sensors.

The AV 102 can include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and/or the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and/or other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV

102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162 and/or a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. In some cases, the client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the ridesharing application 172 to enable passengers to view the AV 102 in transit to a pick-up or drop-off location, and so on.

While the AV 102, the local computing device 110, and the autonomous vehicle environment 100 are shown to include certain systems and components, one of ordinary skill will appreciate that the AV 102, the local computing device 110, and/or the autonomous vehicle environment 100 can include more or fewer systems and/or components than those shown in FIG. 1. For example, the AV 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 8.

Figure 2:
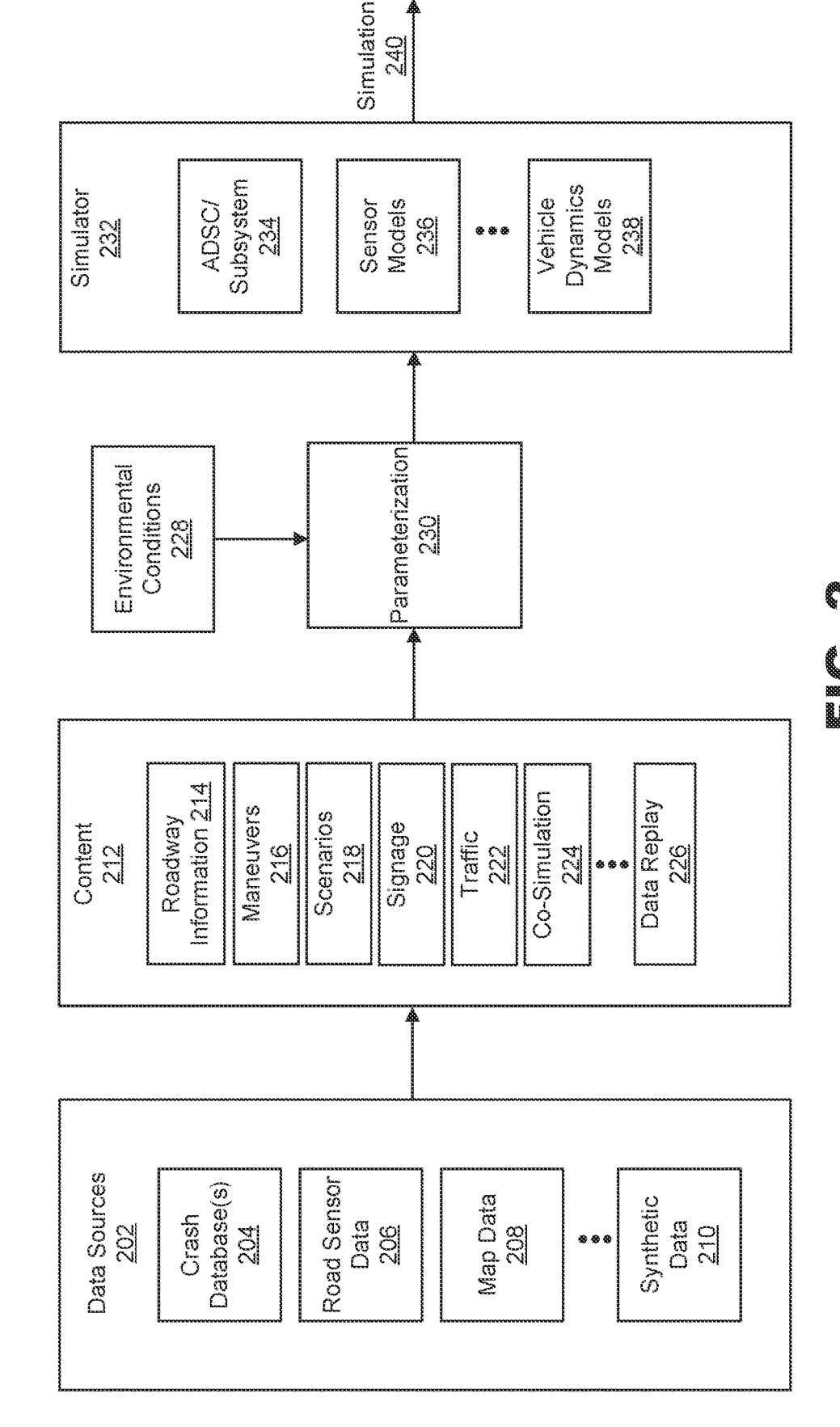
FIG. 2 is a diagram illustrating an example simulation framework, according to some examples of the present disclosure.

FIG. 2 is a diagram illustrating an example simulation framework 200, according to some examples of the present disclosure. The example simulation framework 200 can include data sources 202, content 212, environmental conditions 228, parameterization 230, and simulator 232. The components in the example simulation framework 200 are merely illustrative examples provided for explanation purposes. In other examples, simulation framework 200 can include other components not shown in FIG. 2 and/or more or less components than shown in FIG. 2.

Data sources 202 can be used to create a simulation. The data sources 202 can include, for example and without limitation, one or more crash databases 204, road sensor data 206, map data 208, and/or synthetic data 210. In other examples, the data sources 202 can include more or less sources than shown in FIG. 2 and/or one or more data sources that are not shown in FIG. 2.

Crash databases 204 can include crash data (e.g., data describing crashes and/or associated details) generated by vehicles involved in crashes. The road sensor data 206 can include data collected by one or more sensors (e.g., one or more camera sensors, LIDAR sensors, RADAR sensors, SONAR sensors, IMU sensors, GPS/GNSS receivers, and/or any other sensors) of one or more vehicles while the one or more vehicles drive/navigate one or more real-world environments. The map data 208 can include one or more maps (and, in some cases, associated data) such as, for example and without limitation, one or more high-definition (HD) maps, sensor maps, scene maps, and/or any other maps. In some examples, the one or more HD maps can include roadway information such as, for example, lane widths, location of road signs and traffic lights, directions of travel for each lane, road junction information, speed limit information, etc.

Synthetic data 210 can include virtual assets, objects, and/or elements created for a simulated scene, a virtual scene and/or virtual scene elements, and/or any other synthetic data elements. For example, in some cases, the synthetic data 210 can include one or more virtual vehicles, virtual pedestrians, virtual roads, virtual objects, virtual environments/scenes, virtual signs, virtual backgrounds, virtual buildings, virtual trees, virtual motorcycles/bicycles, virtual obstacles, virtual environmental elements (e.g., weather, lightening, shadows, etc.), virtual surfaces, etc.

In some examples, data from some or all of data sources 202 can be used to create content 212. Content 212 can include static content and/or dynamic content. For example, the content 212 can include roadway information 214, maneuvers 216, scenarios 218, signage 220, traffic 222, co-simulation 224, and/or data replay 226. The roadway information 214 can include, for example, lane information (e.g., number of lanes, lane widths, directions of travel for each lane, etc.), the location and information of road signs and/or traffic lights, road junction information, speed limit information, road attributes (e.g., surfaces, angles of inclination, curvatures, obstacles, etc.), road topologies, and/or other roadway information. The maneuvers 216 can include any AV maneuvers, and the scenarios 218 can include specific AV behaviors in certain AV scenes/environments. Signage 220 can include signs such as, for example, traffic lights, road signs, billboards, displayed messages on the road, etc. The traffic 222 can include any traffic information such as, for example, traffic density, traffic fluctuations, traffic patterns, traffic activity, delays, positions of traffic, velocities, volumes of vehicles in traffic, geometries or footprints of vehicles, pedestrians, spaces (occupied and/or unoccupied), etc.

The co-simulation 224 can include a distributed modeling and simulation of different AV subsystems that form the larger AV system (e.g., perception stack 112, localization stack 114, prediction stack 116, planning stack 118, communications stack 120, control stack 122, etc.). In some cases, the co-simulation 224 can include information for connecting separate simulations together with interactive communications. In some cases, the co-simulation 224 can allow for modeling to be done at a subsystem level while providing interfaces to connect the subsystems to the rest of the system (e.g., the autonomous driving system computer). Moreover, the data replay 226 can include replay content produced from real-world sensor data (e.g., road sensor data 206).

Environmental conditions 228 can include any information about environmental conditions 228. For example, the environmental conditions 228 can include atmospheric conditions, road/terrain conditions (e.g., surface slope or gradient, surface geometry, surface coefficient of friction, road obstacles, etc.), illumination, weather, road and/or scene conditions resulting from one or more environmental conditions, etc.

Content 212 and the environmental conditions 228 can be used to create the parameterization 230. The parameterization 230 can include parameter ranges, parameterized scenarios, probability density functions of one or more parameters, sampled parameter values, parameter spaces to be tested, evaluation windows for evaluating a behavior of an AV (e.g., AV 102) in a simulation, scene parameters, content parameters, environmental parameters, etc. The parameterization 230 can be used by a simulator 232 to generate a simulation 240.

Simulator 232 can include a software engine(s), algorithm(s), neural network model(s), and/or software component(s) used to generate simulations, such as simulation 240. In some examples, the simulator 232 can include ADSC/subsystem models 234, sensor models 236, and a vehicle dynamics model 238. The ADSC/subsystem models 234 can include models, descriptors, and/or interfaces for the autonomous driving system computer (ADSC) and/or ADSC subsystems such as, for example, a perception stack (e.g., perception stack 112), a localization stack (e.g., localization stack 114), a prediction stack (e.g., prediction stack 116), a planning stack (e.g., planning stack 118), a communications stack (e.g., communications stack 120), a control stack (e.g., control stack 122), a sensor system(s), and/or any other subsystems.

Sensor models 236 can include mathematical representations of hardware sensors and an operation (e.g., sensor data processing) of one or more sensors (e.g., a LIDAR, a RADAR, a SONAR, a camera sensor, an IMU, and/or any other sensor). The vehicle dynamics model 238 can model vehicle behaviors/operations, vehicle attributes, vehicle trajectories, vehicle positions, etc.

In some examples, the simulation framework 200 can be used to simulate AV routes for a particular geofence and/or an operational design domain (ODD), specific paths (e.g., sub-routes, route branches, etc.) for an AV route within a geofence and/or an ODD, probabilities that an AV (e.g., AV 102) may traverse a particular route and/or path during a trip, AV reroute probabilities during a trip, and/or error event probabilities associated with a route, path, geofence, and/or ODD, as further described herein. An ODD can include or provide a description of specific operating conditions in which an AV (e.g., AV 102) is designed to operate, including but not limited to roadway types, a speed range(s), environmental conditions (e.g., weather, illumination and/or visibility conditions, time-of-day such as daytime or nighttime, etc.), maneuvers, types of traffic conditions, geographic areas, maps and/or map regions, and/or other operating conditions.

Figure 3A:
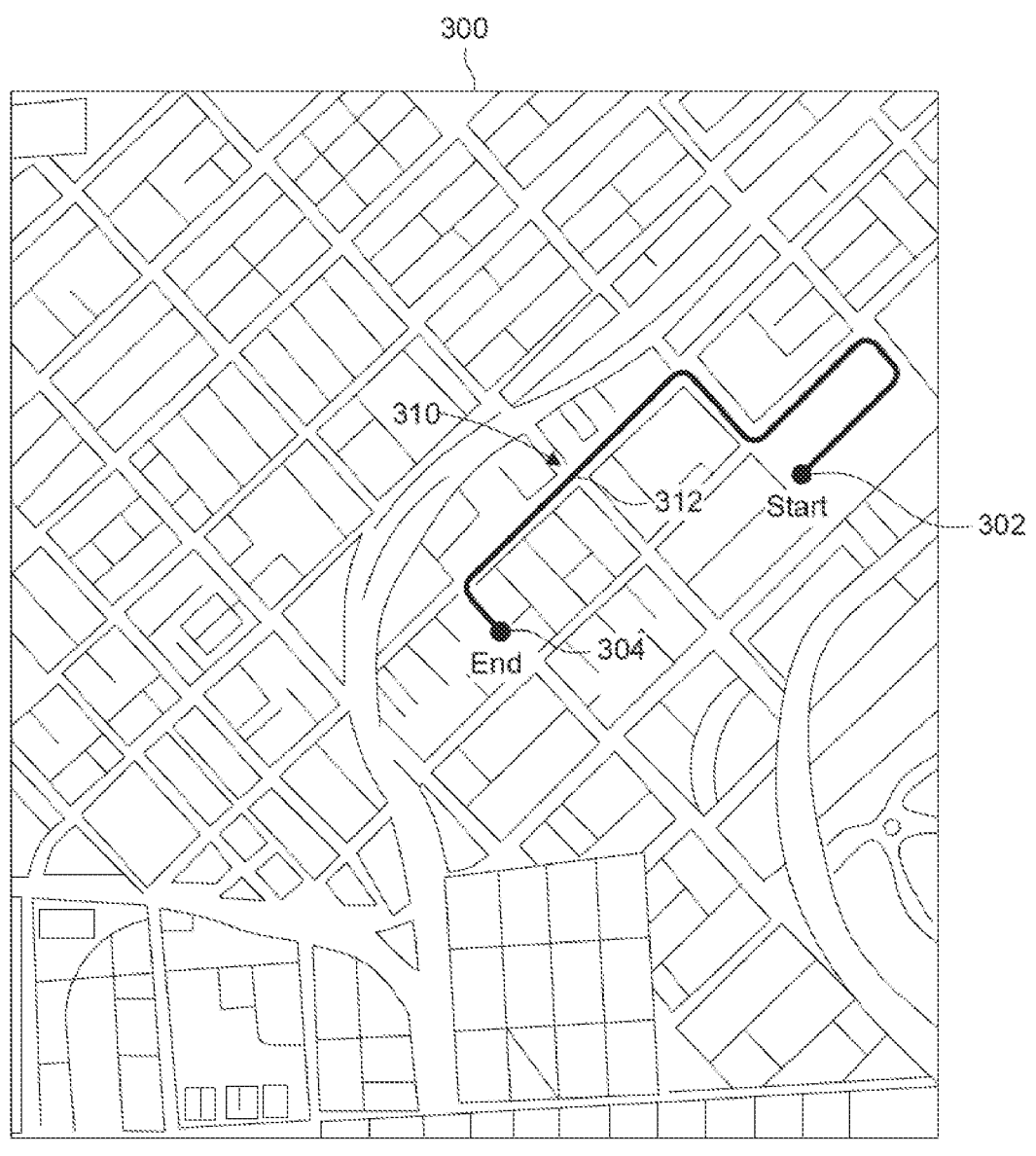
FIG. 3A shows an example map with an example path of an autonomous vehicle route within a geographic area, according to some examples of the present disclosure.

FIG. 3A shows an example map 300 with an example path 312 of an AV route 310 within a geographic area, according to some examples of the present disclosure. The path 312 of the AV route 310 can identify the path that the AV 102 can traverse to reach a destination 304 of the AV route 310 from a starting location 302. The path 312 of the AV route 310 can depend on various factors such as, for example and without limitation, capabilities of the AV 102, constraints of the AV 102, an ODD of the AV 102, the roads within the map 300 and associated traffic rules, etc. For example, the path 312 of the AV route 310 can depend on one-way roads/streets in the area, lane or road closures in the area, construction zones in the area, etc.

In some cases, the path 312 of the AV route 310 can include the road or roads that provide the AV 102 the most direct path from the starting location 302 of the AV route 310 to the destination 304 of the AV route 310, such as the closest/smallest travel distance from the starting location 302 to the destination 304. However, in other cases, the path 312 of the AV route 310 may not include the road or roads that provide the AV 102 the most direct path (e.g., the closest/smallest travel distance from the starting location 302 to the destination 304). For example, the map 300 may include one-way roads that may prevent the AV 102 from using the road or roads that provide the AV 102 the most direct path (e.g., the closest/smallest travel distance from the starting location 302 to the destination 304) to the destination 304. To illustrate, if the destination 304 is on a one-way street with a directionality that prevents the AV 102 from turning into that street from a particular road that otherwise provides the AV 102 the most direct path to the destination 304, the AV 102 may instead need to perform a few turns to enter and navigate the one-way street from and along a direction allowed by the one-way street. The AV 102 can then navigate the one-way street to the destination 304.

In some cases, the AV 102 may be able to navigate the path 312 of the AV route 310 from the starting location 302 to the destination 304 without any reroutes. For example, the AV 102 may be able to traverse the path 312 of the AV route 310 from the starting location 302 to the destination 304 and navigate any scene features along the path 312 of the AV route 310 without having to change the path 312 to (e.g., diverge into) other paths (e.g., other branches or sub-routes) to the destination 304 of the AV route 310. However, many times, the AV 102 may not be able to navigate the path 312 of the AV route 310 from the starting location 302 to the destination 304 without any reroutes. Instead, the AV 102 may encounter one or more scene features along the path 312 of the AV route 310 that the AV 102 is unable to autonomously navigate/traverse and may cause the AV 102 to reroute to (e.g., diverge into) one or more different paths to the destination of the AV route 310. The AV 102 may be unable to autonomously navigate/traverse the one or more scene features as a result of one or more factors such as, for example, an AV constraint(s), an AV capability, etc.

As further described, the systems and techniques of the disclosure can calculate or simulate the various paths (e.g., sub-routes, route branches) that the AV 102 may use to traverse the AV route 310 from the starting location 302 to the destination 304. In some cases, the systems and techniques described herein can also determine a respective probability for each path associated with the AV route 310. The respective probability can indicate the probability/likelihood that the AV 102 will traverse that path when navigating the AV route 310 to the destination 304.

Figure 3B:
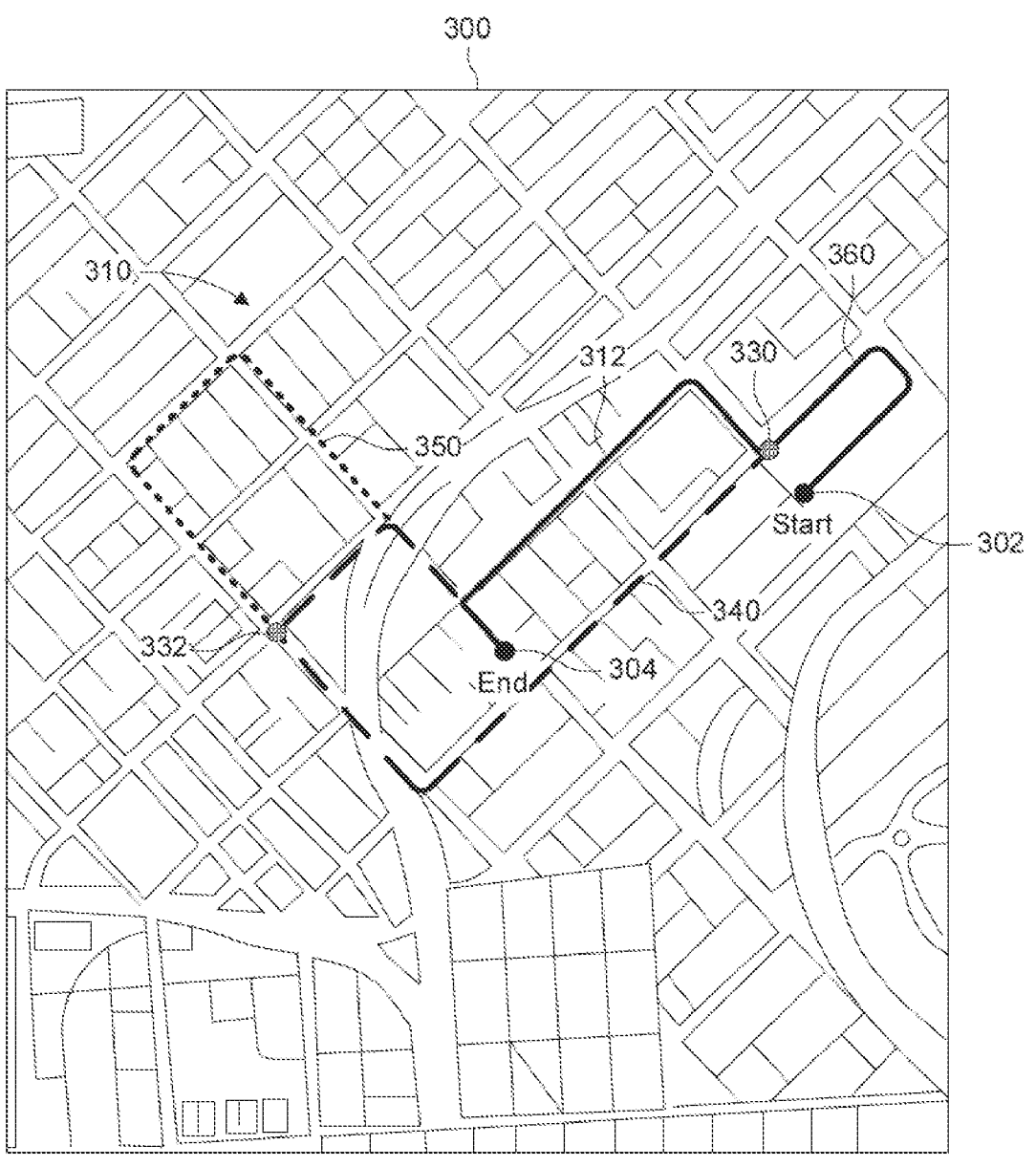
FIG. 3B shows the example map with various paths determined for an autonomous vehicle route within a geographic area, according to some examples of the present disclosure.

FIG. 3B shows the example map 300 with various paths determined for the AV route 310 within the geographic area, according to some examples of the present disclosure. In particular, the map 300 shows different paths 312, 340, and 350 that the AV 102 may use to traverse the AV route 310. The AV 102 may take any of the paths 312, 340, and 350 depending on any scene features along the paths 312, 340, and 350, any AV constraints, and the AV capabilities. For example, the AV 102 may be able to traverse the path 312 if the path 312 does not include any scene features that may cause the AV 102 to reroute to a different path as a result of such scene features. As another example, if the path 312 includes a scene feature that causes the AV 102 to reroute to a different path, the AV 102 may then use path 340 or 350 to reach the destination 304 of the AV route 310. If the AV 102 is using the path 340 and encounters a scene feature along the path 340 that causes a reroute, the AV 102 may then traverse the route 350 to the destination 304.

In the example of FIG. 3B, the AV route 310 can include the path 312 described above with respect to FIG. 3A. Moreover, the AV route 310 includes a path 340 and a path 350. The path 340 and the path 350 can include a path segment 360 that is also included in the path 312. A location 330 at the end of the path segment 360 can include a scene feature that, in some cases, may cause the AV 102 to reroute to path 340. For example, the location 330 can include a sink lane such that, if the AV 102 is unable to change to a particular lane before it needs to make a right turn at the location 330 (or is not in that particular lane when the AV 102 needs to make the right turn at the location 330) to continue along the path 312, the AV 102 may have to reroute at location 330 to path 340, and use path 340 to reach the destination 304.

Similarly, a location 332 along the path 340 can include a scene feature that, in some cases, may cause the AV 102 to reroute to path 350. For example, the location 332 can include a sink lane such that, if the AV 102 is unable to change to a particular lane before it needs to make a right turn at the location 332 (or is not in that particular lane when the AV 102 needs to make the right turn at the location 332) to continue along the path 340, the AV 102 may have to reroute at location 332 to path 350, and use path 350 to reach the destination 304. As another example, the location 332 can include an obstacle that may prevent the AV 102 from turning at the location 332 to continue along the path 340 (or may have less options than a human driver to navigate from the road/street before the location 332 to the road/street after the location 332 along the path 340). The AV 102 may thus have to reroute at location 332 to path 350, and use path 350 to reach the destination 304. As yet another example, the road/street after the location 332 along the path 340 (e.g., the road/street that would be entered along the path 340 after the right turn at the location 332) may have a construction zone or an obstacle that the AV 102 may be unable to navigate. As a result, the AV 102 may reroute to continue to the path 350 after the location 332 rather than continuing through the path 340.

In some cases, the paths 312, 340, and/or 350 can be determined based on an ODD of the AV 102, an AV constraint(s), an AV capability, any scene features along any of the paths (e.g., path 312, path 340, path 350), and/or reroute probabilities calculated for any of the paths. For example, the path 340 can be determined based on one or more scene features at location 330, at a location along the path 312 after the location 330, and/or within a proximity to the location 330, and given an AV constraint(s) and AV capability of the AV 102. Similarly, the path 350 can be determined based on one or more scene features at location 332, at a location along the path 340 after the location 332, and/or within a proximity to the location 332.

In some examples, the path 312 can be a preferred path for the AV route 310, and the paths 340 and 350 can be determined based on reroute probabilities determined for the AV 102. For example, the path 340 can be determined based on one or more reroute probabilities associated with the path 312, and the path 350 can be determined based on one or more reroute probabilities associated with the path 340. In some aspects, the reroute probabilities can be determined based on scene features along the paths. For example, the path 340 can be determined based on a reroute probability calculated for a scene feature(s) associated with the location 330 along the path 312, and the path 350 can be determined based on a reroute probability calculated for a scene feature (s) associated with the location 330 along the path 340. The reroute probability associated with the location 330 along the path 312 can indicate that there is a certain likelihood that the AV 102 may do a reroute to change from the path 312 to the path 340. The reroute probability associated with the location 332 along the path 340 can indicate that there is a certain likelihood that the AV 102 may do a reroute to change from the path 340 to the path 350. In this way, the reroute probabilities can be used to determine the paths that the AV 102 may traverse to complete the AV route 310.

In some cases, the reroute probabilities and/or scene features associated with the path 312, the path 340, and the path 350 can be used to determine probabilities for the path 312, the path 340, and the path 350. The probabilities can indicate the probability that the AV 102 may use the path 312 to complete the AV route 310, the probability that the AV 102 may use the path 340 to complete the AV route 310, and the probability that the AV 102 may use the path 350 to complete the AV route 310. For example, the probabilities can indicate that there is a 40% probability that the AV 102 may use the path 312 for a trip including the AV route 310, a 35% probability that the AV 102 may use the path 340 for a trip including the AV route 310, and a 25% probability that the AV 102 may use the path 340 for a trip including the AV route 310. The probabilities can be determined based on scene features along the path 312, the path 340, and the path 350 and/or reroute probabilities associated with the scene features. For example, given an AV constraint(s) and/or an AV capability associated with the AV 102, the probability for the path 312 and/or the probability for the path 340 can be determined based on a reroute probability calculated based on one or more scene features associated with the location 330 along the path 312. Moreover, given the AV constraint (s) and/or the AV capability associated with the AV 102, the probability for the path 340 and/or the path 350 can be determined based on a reroute probability calculated based on one or more scene features associated with the location 332 along the path 340.

In some cases, the probability for the path 312 can be determined based on a reroute probability associated with the location 330, the probability for the path 340 can be determined based on the reroute probability associated with the location 330 and a reroute probability associated with the location 332, and the probability for the path 350 can be determined based on the probability for the path 312, the probability for the path 340, and any reroute probabilities associated with the path 350.

In some examples, the path 312, the path 340, and/or the path 350 can be determined using the simulation framework 200. For example, the simulation framework 200 can determine the paths 312, 340, and/or 350 based on simulations of the AV route 310. To illustrate, the simulation framework 200 can simulate the paths taken by the AV 102 for the AV route 310 in a number of trips. Based on the simulations, the simulation framework 200 can identify the path 340 and the path 350 as alternative paths to the path 312.

In some cases, the simulation framework 200 can determine the probabilities for the path 312, the path 340, and the path 350. For example, the simulation framework 200 can simulate a number of trips of the AV 102 for the AV route 310 and use the simulations to determine the probabilities that the AV 102 may use the path 312, the path 340, and the path 350 to navigate the AV route 310. In some examples, the simulation framework 200 can use the simulations to determine reroute probabilities and use the reroute probabilities to identify the paths 340 and 350 and/or the probabilities of the path 312, the path 340, and the path 350. In some cases, the simulation framework 200 can simulate how the AV 102 may behave when encountering scene features along the path 312, the path 340, and the path 350, and use the simulated outcomes to determine the probabilities of path 312, path 340, and path 350.

For example, the simulation framework 200 can simulate how the AV 102 may behave when encountering a scene feature associated with the location 330 and a scene feature associated with the location 332. The simulation framework 200 can use the simulated outcomes to determine probabilities for the path 312, the path 340, and the path 350.

In some aspects, the systems and techniques described herein can calculate error event rates for the paths 312, 340, and 350. An error event can include and/or be caused by, for example, a reroute of the AV 102 along a path (e.g., when encountering certain scene features), a failure experienced by the AV 102 that prevents the AV 102 from autonomously handling certain scene features along a path or completing/performing a maneuver along a path, a state where the AV 102 is unable to continue autonomous navigation when it encounters one or more scene features and may need human assistance, and a situation in which the AV 102 may need or request human assistance (e.g., from a remote operator) to perform certain maneuvers or handle (e.g., navigate, avoid, etc.) one or more scene features, among others. The systems and techniques described herein can predict and/or model error events (and/or associated probabilities) along the path 312, the path 340, and the path 350, and use the error events (and/or associated probabilities) to determine error event rates for the path 312, the path 340, and the path 350.

For example, the systems and techniques described herein can determine the number of error events per unit of distance for the path 312, the path 340, and the path 350 to calculate the error event rates, such as the error events per mile for the path 312, the path 340, and the path 350. In some cases, the systems and techniques described herein can predict error events along a path based on one or more types of scene features along the path and/or reroute probabilities calculated for the path. The one or more types of scene features can include, for example, construction zones, intersection choke points, sink lanes, contexts in which the AV 102 has less maneuver/navigation options than a human driver (e.g., due to AV constraints and/or capabilities associated with the AV 102), etc.

In some aspects, the simulation framework 200 can be used to simulate trips and outcomes, which the simulation framework 200 can use to predict the error event rates for the path 312, the path 340, and the path 350. The simulation framework 200 can determine the error event rates for the paths 312, 340, and 350 by simulating how the AV 102 performs when encountering scene features along the paths 312, 340, and 350, such as construction zones, intersection choke points, sink lanes, contexts in which the AV 102 has less maneuver/navigation options than a human driver (e.g., due to AV constraints and/or capabilities associated with the AV 102), etc.

In some aspects, the systems and techniques described herein can determine an aggregated error event rate (and/or aggregated error event probability) for each path based on the probability that the AV 102 will traverse that path when navigating the AV route 310 and the error event rate determined for that path. For example, to determine an aggregated error event rate for the path 312, the systems and techniques described herein can multiply the probability that the AV 102 will traverse the path 312 when navigating the AV route 310 with the error event rate determined for the path 312.

The systems and techniques described herein can determine an overall error event rate (and/or error event probability) of the AV route 310 based on the aggregated error event rates of all of the paths 312, 340, and 350 determined for the AV route 310. For example, the systems and techniques described herein can determine an overall error event rate (and/or error event probability) of the AV route 310 by combining the aggregated error event rates (and/or aggregated error event probabilities) of the paths 312, 340, and 350 of the AV route 310. In some cases, the systems and techniques described herein can combine the overall error event rates (and/or overall error event probabilities) of different routes within the map 300 to determine an error event rate (and/or error event probability) for a geofence or ODD associated with the map 300.

FIG. 4 is a flowchart illustrating an example process 400 for predicting error events of AVs for routes within a geofence (and/or an ODD), according to some examples of the present disclosure. At block 410, the process 400 can include, based on a geofence 402 for the AV 102, determining routes within the geofence 402. In some examples, the process 400 can determine the routes based on the geofence 402, an ODD associated with the AV 102, an AV constraint (s) (e.g., software constraints, routing/operation restrictions, maneuver constraints, etc.) of the AV 102, AV capabilities 404 of the AV 102, and/or scene features (e.g., lane types, number of lanes, lane directionalities, obstacles, traffic rules, etc.) associated with the geofence 402. For example, the process 400 can use the geofence 402 and AV capabilities 404 of the AV 102 to determine one or more routes within the geofence 402.

In some cases, the process 400 can determine the one or more routes based on one or more specified trips within the geofence 402. In some examples, the process 400 can use the simulation framework 200 to determine the one or more routes. For example, the simulation framework 200 can use the geofence 402, the AV capabilities 404, and/or AV constraints to simulate trips within the geofence 402 and determine one or more routes within the geofence 402 based on the simulated trips.

At block 420, the process 400 can include determining, for each route (e.g., AV route 310) from the routes within the geofence 402, route paths (e.g., path 312, path 340, path 350) from a starting location (e.g., starting location 302) to a destination location (e.g., destination location 304) of the route. Each route path can include a road/street that the AV 102 can travel from the starting location of the route to the destination location of the route (e.g., and thus the road/street provides a path for the route) or a sequence of roads/streets that the AV 102 can travel from the starting location of the route to the destination location of the route (e.g., and thus provides a path of roads/streets for the route). In some cases, the route paths for a route can be generated based on an initial path determined for the route.

For example, the process 400 can identify an ideal or preferred path for a route (e.g., an ideal or preferred road/street or sequence of roads/streets from the starting location to the destination location of the route) and identify one or more paths (e.g., one or more route branches or sub-routes) based on the ideal or preferred path. To illustrate, the process 400 can identify an initial path for a route, such as a preferred path, a path with a shortest distance to the destination location, a path having a shortest time-of-arrival to the destination location, a path having a particular (e.g., lowest) battery consumption, a path having a lowest likelihood of causing an error event (e.g., a reroute, an inability to operate autonomously for at least a threshold period of time when encountering a scene feature along the path, an inability to continue the path without human assistance, an operating failure, a stuck state, etc.), and/or any initial path. The process 400 can identify a location(s) within the initial path (and/or scene features within the initial path) having a threshold reroute likelihood (e.g., probability), and identify a path branch (or branches) at the location(s) based on the threshold reroute likelihood. To identify the path branch (or branches) from the location(s) having the threshold reroute likelihood, the process 400 can determine how the path branch (or branches) would diverge at the location(s) based on traffic constraints at the location(s), AV constraints, AV capabilities, an ODD of the AV 102, the directionality of roads/streets connected to the location(s) relative to a direction of travel of the AV 102 and/or relative to the destination location, possible roads/streets that the AV 102 can reroute to from the location(s), a scene feature associated with the location(s), and/or any other factors. In some cases, the process 400 can identify one or more additional path branches (e.g., sub-routes) from the path branch (e.g., from a location(s) within the path branch having a threshold reroute likelihood) identified from the location(s) as described above with respect to the path branch identified from the initial path.

In some examples, the route paths of a route can be determined based on the starting location and destination location of the route, as well as one or more additional factors. Non-limiting examples of the one or more additional factors can include an ODD of the AV 102, the directionality (e.g., one way, two way, northbound, southbound, eastbound, westbound, etc.) of lanes and/or roads/streets within a geographic area that includes the starting location and the destination location and/or within a threshold proximity to the starting and destination locations (and/or a region including or relative to the starting and destination locations), each sequence (or a subset of all sequences within a geofence and/or a threshold distance and/or estimated time of arrival) of identified roads/streets that can provide a path from the starting location to the destination location, any scene features within identified roads/streets that can provide a path from the starting location to the destination location, one or more constraints of the AV (e.g., maneuver constraints, navigation constraints, operating constraints, ODD constraints, etc.), one or more AV capabilities (e.g., software capabilities, navigation capabilities, maneuver capabilities, perception/sensing capabilities, mechanical capabilities, etc.), and/or a subset of a set of sequences of roads/streets that can provide paths from the starting location to the destination location that are identified (e.g., the subset) from the set of sequences of roads/streets based on characteristics of the sets of sequences (e.g., energy/battery consumption of each sequence, estimated time of arrival of each sequence, distance of each sequence, error event rate of each sequence, etc.), the number of maneuver and/or navigation options that the AV 102 has relative to a human driver at one or more locations along one or more possible paths, among other factors.

In some cases, the route paths for the route can be determined based on simulations performed using the simulation framework 200. For example, the simulation framework 200 can simulate a number of trips for the route. The simulated trips can identify a number of possible paths for the route based on the simulations. The possible paths can include the route paths determined for the route. Thus, the simulated trips can be used to identify the route paths for the route. In some examples, to identify the route paths based on simulated trips, the simulation framework 200 can take into account the starting and destination locations of the route as well as other factors such as, for example, an ODD of the AV 102, one or more AV constraints of the AV 102, one or more capabilities of the AV 102 (e.g., software capabilities, sensing/perception capabilities, maneuver capabilities, navigation/routing capabilities, mechanical capabilities, etc.), scene features in possible roads/streets and/or paths, reroute likelihoods (e.g., probabilities) associated with locations along roads/streets and/or paths, the number of maneuver options of the AV 102 relative to a human driver at specific locations along a path(s), traffic rules, road/street and/or lane directionalities, and/or other factors.

In some aspects, the process 400 can additionally or alternatively determine the route paths for the route based on statistics and/or log data collected from previous trips for the route. For example, the process 400 can determine the route paths taken for the route in n number of previous trips, and determine the route paths for the route based on the route paths previously taken for the route.

As previously noted, in some cases, the route paths can be determined based on reroute likelihoods (e.g., probabilities)

determined at specific locations along an initial route path and any other route branches (sub-routes) determined from the initial route path. In some aspects, the reroute likelihood for a particular location and/or scene feature along a path can be determined based on a maneuver(s) and/or constraint(s) associated with that particular location and/or scene feature as well as a capability of the AV 102, a constraint of the AV 102, and/or an ODD of the AV 102. In some cases, the reroute likelihood for a particular location and/or scene feature along a path can be determined based on previous trips. For example, the reroute likelihood for a particular location and/or scene feature can be determined based on previous reroutes that occurred during previous trips for the route. As another example, the reroute likelihood for a particular location and/or scene feature can additionally or alternatively be determined based on previous take-overs by a human in a human-supervised AV autonomously navigating the route in previous trips.

To illustrate, a take-over can refer to a situation where an AV is autonomously navigating a scene and a human in the AV takes control of the AV to manually control the AV during (and/or to perform) a certain maneuver and/or for a period of time. The take-over can occur, for example and without limitation, if the AV experiences an error event, if the human in the AV perceives a need to take control of the AV, and/or if the AV is unable to perform a maneuver, navigate a scene feature (e.g., an intersection, a merge lane, a sink lane, an intersection choke point, a construction zone, a scene with a closed lane, a scene with an accident, a scene with a failed traffic signal/light, a scene with a threshold amount of pedestrian traffic and/or other traffic, etc.), etc. A take-over logged during a trip of the route can be used to determine a reroute likelihood for a location and/or scene feature associated with the take-over, as the take-over can indicate that the AV 102 may be unable to navigate that location and/or scene feature, may be unable to perform a maneuver at that location and/or when encountering that scene feature, may need to be rerouted when reaching that location and/or encountering that scene feature, and/or may have less options for autonomous navigation and/or maneuvers than a human driver when encountering that location and/or scene feature. In some cases, the location and/or scene feature that triggered a take-over event can be identified as a reroute point (e.g., a path branch/divergence location) such that each take-over event results in a reroute point. In other cases, the determination of whether a take-over event results in (e.g., is treated as or triggers) a reroute point can depend on the type of take-over event. For example, some take-over events may not be treated as indicating a reroute point (and/or a threshold reroute likelihood), and other take-over events may be treated as indicating a reroute point (and/or threshold reroute likelihood).

In some examples, the scene features along a possible route path can be used to determine a path branch location (e.g., a path divergence into a different route path/branch and/or sub-route). For example, some scene features may be deemed, estimated, and/or predicted to have a threshold reroute likelihood given one or more constraints of the AV 102, one or more capabilities (and/or lack thereof) of the AV 102, AV trip statistics, an ODD of the AV 102, and/or the number of options of autonomously handling and/or navigating such scene features by the AV 102 relative to a human driver (e.g., less options for autonomously handling and/or navigating such scene features than a human driver can indicate a particular reroute likelihood such as a higher reroute likelihood). To illustrate, some scene features, such as, for example and without limitation, intersection choke points, sink lanes, sink superlanes, cascaded sink superlanes, and/or construction zones may be predicted to have or identified as having a threshold reroute likelihood because the AV may have less options to maneuver/navigate such scene features than a human driver, because the AV may have certain constraints that reduce a likelihood that the AV may be able to handle/navigate such scene features, because the AV may lack certain capabilities that would allow the AV to (or increase the likelihood of the AV being able to) handle/navigate such scene features, because of take-over events experienced in previous trips when encountering such scene features, and/or because of reroute statistics associated with such scene features.

At block 430, the process 400 can include determining an error event likelihood of each route path from the route paths of each route. In some examples, an error event can include an AV reroute, a failure of the AV 102 to complete or perform an autonomous maneuver for a scene feature along the route path, an inability of the AV 102 to continue an autonomous operation for at least a threshold period of time, an inability of the AV 102 to continue an autonomous operation without assistance from a human. The error event likelihood can indicate a probability that the AV 102 will encounter an error event if the AV 102 uses that route path for a trip including the route.

In some examples, the process 400 can determine the error event likelihood of a route path based on simulated trips including the route path or including one or more scene features along the route path. In other examples, the process 400 can determine the error event likelihood of a route path based on one or more scene features (e.g., lanes, construction zones, obstacles, merge lanes, sink lanes, intersections, intersection choke points, lane directionalities, road conditions, lane types, etc.) along the route path, one or more AV constraints (e.g., maneuver constraints, turning constraints, merge constraints, scene type constraints, speed constraints, obstacle avoidance constraints, avoidance area constraints, minimum buffer distance constraints, etc.), one or more AV capabilities (e.g., software capabilities, sensing/perception capabilities, maneuver capabilities, scene capabilities, context capabilities, mechanical capabilities, navigation/routing capabilities, operating capabilities, etc.) and/or lack thereof, an ODD of the AV 102, and/or any other parameters associated with the AV 102 and/or the scene feature. For example, the process 400 can compare a maneuver (and/or associated parameters) needed to navigate a scene feature and/or any constraints associated with the scene feature with the capabilities of the AV 102, any constraints of the AV 102, and/or an ODD of the AV 102, to determine a likelihood that the scene feature will cause an error event to the AV 102.

In some cases, to determine the error event likelihood of a route, the process 400 can determine whether the route path includes a scene feature(s) estimated to have a threshold likelihood of causing an error event when the AV 102 encounters that scene feature(s) during an autonomous operation of the AV 102. For example, the process 400 can determine, for each route path, whether the route path has any scene features that are estimated (e.g., predicted, identified, predetermined, calculated, etc.) to have a threshold likelihood of causing an error event when the AV 102 encounters the scene features and attempts to autonomously navigate and/or handle (e.g., maneuver, traverse, operate in, etc.) such scene features. In some examples, to determine the error event likelihood of a route, the process 400 can identify one or more scene features along the route path and determine a likelihood that the one or more scene features would cause an error event to the AV 102 if the AV 102 encounters the one or more scene features during an autonomous operation of the AV 102. In some cases, the one or more scene features can include certain types of scene features identified as having a threshold likelihood of causing an error event, scene features associated with one or more constraints and/or maneuvers that conflict with any constraints and/or capabilities of the AV 102, one or more predetermined scene features associated with error events, etc.

As previously noted, an error event can include, for example and without limitation, an event generated (e.g., by the AV 102), experienced/encountered, including, and/or occurring when an AV 102 needs to change (and/or has a threshold likelihood of needing to change) its planned route path (e.g., a reroute), experiences a take-over event, experiences a reroute in one or more simulations (e.g., via the simulation framework 200), is unable to continue an autonomous operation for a threshold period of time (e.g., is stuck for a threshold period of time, and/or needs (and/or requests) human assistance (e.g., from a remote operator) as a result of a scene feature (e.g., a condition, context, environment, obstacle, traffic rule, road/lane configuration, etc., associated with a scene) encountered by the AV 102 along a route path, a failure experienced by the AV 102 (e.g., a failure to complete or perform a maneuver, a failure to continue along a route path, a failure to autonomously navigate a scene and/or associated context, etc.); a state of the AV (e.g., a stuck state, etc.) that may require (and/or trigger a request for) human assistance (e.g., as a result of a traffic constraint, an AV constraint, an inability to complete or perform a maneuver, a lack of an AV capability, etc.), among others. For example, the AV 102 may experience an error event when the AV 102 encounters a scene feature that causes the AV 102 to be rerouted to avoid or overcome the scene feature 102 or otherwise causes a need or request for human assistance to address/handle and/or navigate the scene feature.

To illustrate, an error event can include an event in which the AV 102 may need (and/or has a likelihood of needing) human assistance to navigate a scene feature and/or perform a particular maneuver when encountering the scene feature, when the AV 102 experiences a navigation or operation error (e.g., a failure, etc.), when the AV 102 experiences a scenario in which the AV 102 is unable to autonomously continue a route path and/or maneuver through or around a scene or scene feature (e.g., a stuck scenario where the AV 102 becomes stuck in a scene, etc.), when the AV 102 needs to perform a reroute, and/or when the AV 102 encounters a condition (e.g., an obstacle, a road hazard, a traffic condition, etc.) that the AV 102 is unable to autonomously handle without rerouting to avoid the condition or without human assistance.

In some cases, the process 400 can identify a number of scene features that are predetermined to have a threshold likelihood of causing an error event when the AV 102 encounters such scene features during an autonomous operation of the AV 102. Non-limiting examples of such predetermined scene features can include intersection choke points, sink lanes, sink superlanes, cascaded sink superlanes, construction zones, and/or contexts in which the AV 102 has less options for navigating (autonomously) such contexts and/or performing a maneuver (autonomously) associated with such contexts than a human driver. In some examples, such scene types can be determined based on simulated trips, prior trips statistics, AV capabilities, AV constraints, operating parameters, etc. In other examples, the predetermined scene features may include other types of scene features than those noted above, and/or may include more or less predetermined scene features than the example scene features noted above.

In such examples, the process 400 can use the predetermined scene features to identify scene features in a route path estimated to have a threshold likelihood of causing an error event. For example, the process 400 can determine if a route path includes any of the predetermined scene features (and/or can search for any predetermined scene features along a route path). If the process 400 determines that the route path includes a predetermined scene feature, the process 400 can identify the scene feature in the route path as having a threshold likelihood of causing an error event. The process 400 can use the determination of such scene feature occurring along the route path and/or the error event likelihood of that scene feature (and/or any other predetermined scene features along the route path) to determine the likelihood that the route path will cause an error event to the AV 102 if used for the route. In some examples, the process 400 can additionally identify a location along the route path of that scene feature and/or alternative route path options (e.g., route path branches) at (and/or after) that location.

In some aspects, the simulation framework 200 can simulate trips along each route path and use the simulated trips to determine an error event likelihood of each route path. In some examples, the simulated trips can be used to determine whether each route path has any scene features that have a likelihood of causing an error event, caused an error event in one or more of the simulated trips, and/or caused an error event in a threshold ratio of the simulated trips. The process 400 can use the likelihood of any scene features along a route path causing an error event for the AV 102 to determine an error event likelihood for the route path. For example, if the process 400 determines that a route path has one scene feature that has X likelihood of causing an error event for the AV 102, the process 400 can determine that the route path has an X likelihood of causing an error event for the AV 102.

In some cases, as further described herein, the process 400 can further determine the probability that the AV 102 will use each route path for the route, and determine the error event likelihood of each route path based on the probability that the AV 102 will use that route path for the route and the error event likelihood determined for that route path. To illustrate, if the process 400 determines that there is an X probability of the AV 102 using a route path for a trip including the route and the route path has a Y likelihood of causing an error event for the AV 102, the process 400 can determine that the error event likelihood of the route path is X times Y.

In some cases, the process 400 can determine a scene feature that has a likelihood of causing an error event based on a parameter and/or characteristic of the scene feature (e.g., a context, a condition(s), a traffic rule, a type of maneuver associated with the scene feature, maneuver and/or navigation capabilities needed for autonomously navigating that scene feature, constraints that would prevent autonomous navigation of the scene feature, etc.) as well as capabilities (and/or lack thereof) of the AV 102 (e.g., software, sensing/perception, maneuvering, navigation/routing, autonomous operation, etc.) and/or any constraints of the AV 102 (e.g., rules, navigation/operating restrictions, settings, parameters, scene restrictions, etc.). For example, the process 400 can determine a particular maneuver that the AV 102 may need to perform when it encounters a particular scene feature. If process 400 determines that the AV 102 does not have the capabilities to perform such maneuver or has a constraint that may prevent the AV 102 from performing such maneuver, the process 400 can determine that such scene feature has a certain likelihood of causing an error event. The process 400 can use the scene feature's likelihood of causing an error event to determine a likelihood of the route path that includes that scene feature causing an error event for the AV 102. The process 400 can make the error event likelihood of the route path the same as the scene feature's likelihood of causing an error event or can combine with other values such as, for example, one or more other error event likelihoods calculated for one or more other scene features along the route path and/or a probability that the AV 102 will use the route path to navigate the route (e.g., as opposed to other route paths of the route).

As previously noted, capabilities and/or constraints of the AV 102 can be considered when determining an error event likelihood of a scene feature and/or a route path associated with a scene feature. The capabilities of the AV 102 considered in determining an error event likelihood can include, for example and without limitation, software capabilities, perception/sensing capabilities, maneuver capabilities, navigation/routing capabilities, mechanical capabilities, hardware capabilities, operating capabilities, scene and/or context capabilities, planning capabilities, and/or any other capabilities. The constraints of the AV 102 considered in determining an error event likelihood can include, for example and without limitation, a merge constraint (e.g., how the AV 102 is allowed or not allowed to perform a merge maneuver and/or circumstances in which the AV 102 is allowed or not allowed to perform a merge maneuver), a minimum buffer distance constraint (e.g., a minimum distance the AV 102 needs to maintain from a leading vehicle ahead of the AV 102), a maneuver constraint (e.g., a maneuver or maneuver parameter that the AV 102 is not allowed to implement, a minimum or maximum maneuver parameter, etc.), a lane maneuver/navigation constraint, an intersection maneuver/navigation constraint, a speed constraint, a turning or steering wheel rotation constraint (e.g., a maximum turning or steering wheel rotation angle that the AV 102 is allowed to implement), a routing constraint, a minimum obstacle distance constraint, a safety constraint, and/or any other constraint.

In some cases, the process 400 can determine an error event likelihood of a route path and/or a scene feature having a likelihood of causing an error event based on previous trips and/or previous take-over events. For example, if the AV 102 encounters an error event when encountering a scene feature in a previous trip, in a threshold number of previous trips, or in a ratio of previous trips, the process 400 can determine that the scene feature has a certain likelihood of causing an error event. The process 400 can use that information to determine the error event likelihood of a route path that includes that scene feature. As another example, if the AV 102 encounters a take-over event when navigating a route path and/or encountering a scene feature in a previous trip, in a threshold number of previous trips, or in a ratio of previous trips, the process 400 can determine an error event likelihood based on the take-over event information and/or determine that a scene feature associated with the take-over event has a threshold likelihood of causing an error event.

In some examples, the process 400 can search each route path for any of a number of scene features determined to have a likelihood of causing an error event. If the process 400 identifies any of the number of scene features along a route path, the process 400 can determine that the route path includes the identified scene feature(s) having the likelihood of causing an error event. The process 400 can use the identified scene feature(s) to determine an error event likelihood associated with that route path. Moreover, the process 400 can identify scene features along a route path and compare the scene features along the route path with a number of scene features predetermined to have a likelihood of causing the error event. If the process 400 identifies a match, the process 400 can determine that the route path includes a scene feature (e.g., the matching scene feature) that has a likelihood of causing the error event. The process 400 can use the scene feature's likelihood of causing the error event to determine an error event likelihood of the route path that has that scene feature.

In some examples, to determine the error event likelihood of each route path associated with a route, the process 400 can determine a likelihood that the AV 102 will use that route path for the route. The process 400 can then determine the error event likelihood based on the likelihood that the AV 102 will use that route path for the route and the error event likelihood determined for the route path, as previously described. For example, if a route includes route path A, route path B, and route path C, the process 400 can determine the probabilities that the AV 102 will use route path A, route path B, and route path C. To illustrate, the process 400 can determine that route path A has an X probability of being used for the route, route path B has a Y probability of being used for the route, and route path C has a Z probability of being used for the route. The process 400 can then combine the route path probability of a route path (e.g., X probability of route path A, Y probability of route path B, Z probability of route path C) with the error event likelihood of the route path. For example, to determine the error event likelihood for route path A, the process 400 can multiply X probability (the probability of route path A being used) with the error event likelihood determined for route path A. To determine the error event likelihood for route path B, the process 400 can multiply Y probability (the probability of route path B being used) with the error event likelihood determined for route path B, and to determine the error event likelihood for route path C, the process 400 can multiply Z probability (the probability of route path C being used) with the error event likelihood determined for route path C.

In some cases, the process 400 can use the scene feature (if any) in a route path of a route to determine an error event rate of the route path. For example, the process 400 can determine a number of scene features in the route path estimated to have the threshold likelihood of causing an error event to the AV 102, and determine the error event rate of the route path based on the number of scene features in the route path and a distance of the route path. To illustrate, the process 400 can divide the number of scene features in the route path by the distance of the route path to determine an error event rate of the route path per unit of distance. In some cases, the process 400 can combine the error event rates of the route paths of a route to determine an aggregated error event rate of a route. In this way, the process 400 can determine the aggregated error event rate of each route.

The process 400 can also combine the aggregated error event rate of each route within the geofence to determine an overall error event rate of the geofence. In some cases, the process 400 can use the overall error event rate of a geofence to determine how certain changes to an AV capability, component, ODD, and/or constraint may affect the overall error rate of the geofence; to prioritize or deprioritize any changes to an AV capability, component, ODD, and/or constraint; to plan for changes to an AV capability, component, ODD, and/or constraint; etc.

At block 440, the process 400 can include determining, based on the error event likelihood of each route path of each route, an aggregated error event likelihood of each route. For example, the process 400 can combine the error event likelihood calculated for each route path of a route at block 430 to determine the aggregated error event likelihood of that route. In this way, the process 400 can calculate the aggregated error event likelihood of each route within the geofence.

As previously noted, the error event likelihood of each route path can capture the likelihood that the route path would cause an error event for the AV 102 if the AV 102 uses the route path for the route. Thus, the aggregated error event likelihood of a route can capture the combination of likelihoods that the route paths of the route would cause an error event for the AV 102. In some cases, the error event likelihood of each route path can also capture the likelihood that the AV 102 will use the route path to navigate the route (e.g., as opposed to using any of the other route paths associated with the route). Thus, the aggregated error event likelihood of a route can capture the combination error event likelihood for the route paths of the route, and the error event likelihood of each route path can capture the combination of the likelihood that the route path of the route would cause an error event for the AV 102 and the likelihood that the AV 102 will use that route path for the route.

At block 450, the process 400 can optionally include determining an overall error event likelihood for the routes within the geofence based on the aggregated error event likelihood of each route from the routes within the geofence. For example, the process 400 can add the aggregated error event likelihood of each route from the routes within the geofence to determine an overall error event likelihood of the routes within the geofence. The overall error event likelihood of the routes within the geofence can represent an error event likelihood of the geofence (and/or an ODD associated with the geofence).

The overall error event likelihood of the geofence can be used to implement (or determine whether or how to implement) certain changes to the ODD of the AV 102, such as associated avoidance areas (e.g., areas that the AV should avoid), restricted areas, a geofence associated with the ODD, permitted or restricted lanes/roads, operating conditions, operating restrictions, and/or any other ODD parameter and/or feature. In some examples, the overall error event likelihood of a geofence can additionally or alternatively be used to implement (or determine whether or how to implement) an AV constraint(s), an AV limitation, an update to the AV (e.g., software, hardware, mechanical, etc.), and/or an AV capability. The AV constraint(s) can include any AV constraints described herein such as, for example, a maneuver constraint, a minimum buffer distance restriction, a maximum turning angle or steering wheel rotation restriction, a maximum speed restriction, a speed range restriction, a geographic restriction, an obstacle distance restriction, an operating restriction, a merge restriction, a navigation restriction, a lane restriction, a construction zone restriction, an intersection restriction, a condition restriction, etc. The AV limitation can include a restriction or limitation of a software capability, a perception/sensing capability, a hardware capability, a maneuver capability, a navigation capability, a mechanical capability, etc. The AV capability can include any AV capability described herein such as, for example, a software capability, a perception/sensing capability, a hardware capability, a maneuver capability, a navigation capability, a mechanical capability, etc.

In some cases, the overall error event likelihood of a geofence can be used to determine how certain changes to an ODD, an AV constraint(s), and/or an AV capability may affect the overall error event likelihood of the geofence; to prioritize (or deprioritize) certain changes to an ODD, an AV constraint(s), and/or an AV capability; to determine how (and/or whether) to modify an ODD, AV constraint(s), and/or AV capability; to implement an AV update (e.g., software, hardware, mechanical, etc.); and/or to plan for certain changes to (and/or implementations of) an ODD, an AV constraint(s), and/or an AV capability.

In some examples, the process 400 can model how certain scene features (e.g., lanes, intersections, lane change areas, merge areas, construction zones, road closures, yield areas, intersection choke points, sink lanes, sink superlanes, cascaded sink superlanes, etc.) can cause error events such as lane change failures, merge failures, reroutes, human assistance requests/events, vehicle stuck situations, vehicle recovery events, operating failures, etc. In some cases, the process 400 can model a relationship between certain error events and/or scene features. For example, the process 400 can model how certain lane change failures, maneuver failures, and/or merge failures may cause reroutes and thus route path changes. In some aspects, the process 400 can use predictive modeling to determine the impact of routing policy changes, AV constraint changes, AV capability changes, ODD changes, etc., and use such information to mitigate or avoid problems.

FIG. 5 is a flowchart illustrating an example process 500 for determining an aggregated error event likelihood of each route from the routes within a geofence. For example, the process 500 can be implemented at block 440 of FIG. 4 to determine the aggregated error event likelihood of each route from the routes within the geofence.

At block 500, the process 500 can include determining, for each route path from the route of paths of each route, a respective likelihood that the AV will use the route path to traverse the route. For example, if there are three route paths identified for a route, the process 500 can determine a certain likelihood or probability that the AV will use the first path for the route, a likelihood or probability that the AV will use the second path for the route, and a likelihood or probability that the AV will use the third path for the route.

In some examples, the process 500 can determine the respective likelihood of each route path based on a number of simulated trips for the route. For example, the simulation framework 200 can simulate a number of trips for the route. Based on the simulated trips, the process 500 can determine the likelihoods or probabilities for the route paths associated with the route. In some cases, the simulations can include simulated trips using each route path for the route, and the process 500 can determine the respective likelihood or probability of each route path based on the ratio of simulated trips that used that route path and/or a likelihood of a reroute from one or more route paths in the simulated trips to that particular route path.

In some examples, the process 500 can determine the respective likelihood of each route path based on reroute probabilities along the route path (and/or a route path that diverges into the route path). For example, the process 500 can determine that the route path has one or more scene features having a threshold reroute probability and determine the respective likelihood of the route path based on the threshold reroute probability and/or the threshold reroute probability relative to any threshold reroute probabilities (and/or lack thereof) identified for other route paths of the route. In some cases, the process 500 can additionally consider any threshold reroute probabilities determined for one or more route paths that may diverge into the route path (e.g., if the AV 102 reroutes from the one or more route paths to the route path). Thus, the process 500 can consider the reroute probabilities of other route paths that can lead to that route path (e.g., if the AV 102 reroutes/diverges to that route path from other route paths) as well as the reroute probabilities of that route path (e.g., which can indicate a probability that the AV 102 may reroute/diverge from that route path to another route path). For example, the process 500 can combine or multiply the reroute probabilities of other route paths that can lead to a particular route path (e.g., the likelihood that the AV 102 will change from other route paths to the particular route path) and the reroute probability of that particular route path, which can indicate the likelihood that the AV 102 may leave the particular route path to continue along a different route path.

In some aspects, the process 500 can determine the respective likelihood of each route path based on the scene features (and/or type of scene features) along the route path. For example, certain types of scene features may indicate and/or result in a threshold likelihood that the AV will experience an error event, such as a reroute. Thus, such scene features can be used to determine the likelihood that the AV will remain on a particular route path or will reroute to a different route path (e.g., when encountering a scene feature or prior to encountering a scene feature). In some cases, to determine the likelihood of a route path, the process 500 can calculate the likelihood that the AV may travel and remain in that route path (as opposed to rerouting to another route path) based on a scene feature(s) along that route path (and/or the type of scene feature) as well as the likelihood that the AV may navigate and leave (e.g., reroute) a portion of one or more route paths that lead to that route path (e.g., that have one or more segments overlapping with that route path). For example, if route path B includes a portion of route path A such that, to reach route path B, the AV would travel that overlapping portion of route path A and use route path B upon leaving (e.g., rerouting) from that portion of route path A to route path B, the process 500 can calculate the likelihood of route path B based on the likelihood that the AV will use the overlapping portion of route path A and reroute to route path B from route path A, as well as a likelihood (e.g., determined based on a scene feature(s) along route path B) that the AV will remain in route path B.

At block 520, the process 500 can include determining, based on a scene feature(s) of each route path from the route paths of the route, a respective error event likelihood associated with each route path. For example, the process 500 can identify any scene features along a route path that have a likelihood of causing an error event for the AV 102 (e.g., if the AV 102 encounters such scene features), and calculate an error event likelihood for that route path based on a scene feature's likelihood of causing an error event (and/or a combination of the likelihoods of various scene features along the route path). In some cases, the process 500 can determine an error event rate of a route path based on a number of error events and/or scene features having a likelihood of causing an error event, and a distance of the route path. For example, the process 500 can determine a number of scene features that have a threshold likelihood of causing an error event and determine an error event rate of the route path based on the number of scene features and a distance of the route path.

To illustrate, the process 500 can calculate the error events per mile of a route path based on the number of error events estimated for the route path (e.g., based on a number of certain scene features along the route path) and the number of miles of the route path. For example, in some cases, the process 500 can determine the respective error event rate of a route path as follows: Error Event Rate=Errors (or associated scene features)/Distance.

In some examples, the process 500 can have a number of scene features that are predetermined to have a threshold likelihood of causing an error event and compare scene features of the route path with the number of predetermined scene features to determine whether the route path has any scene features (and/or how many scene features) that match one or more of the scene features from the number of predetermined scene features. The process 500 can use the scene features along the route path determined to have a threshold likelihood of causing an error event and a distance of the route path to determine the error event rate of the route path.

In some cases, the process 500 can determine which scene features have a threshold likelihood of causing an error event based on simulated trips (e.g., via simulation framework 200) and/or previous trips. For example, the process 500 can determine scene features that have a threshold likelihood of causing an error event based on scene features that caused an error event or resulted in a threshold probability of causing an error event in a number of simulated trips. As another example, the process 500 can determine scene features that have caused an error event in prior trips and/or that have caused a take-over event in prior trips. The process 500 can compare scene features in the route path with scene features identified as having a threshold likelihood of causing an error event to determine a number (if any) of scene features along the route path estimated to have a likelihood of causing an error event. The process 500 can use the number of scene features identified as having a likelihood of causing an error event and the distance of the route path to determine the error event rate of the route path.

In some aspects, the process 500 can identify scene features along a route path and determine for each scene feature the likelihood/probability of that scene feature causing an error event. The process 500 can then identify any scene features that have a likelihood/probability that satisfies or is above a threshold likelihood/probability, and determine the error event likelihood of that route path based on the scene features (if any) that have a likelihood/probability that satisfies or is above a threshold likelihood/probability. In some examples, the process 500 can determine the likelihood/probability of a scene feature causing an error event based on simulated trips have that scene feature (e.g., based on a number of error events caused by that scene feature in the simulated trips and/or a probability of that scene feature causing an error event in the simulated trips), previous AV trips along routes having that scene feature, and/or previous take-over events involving that scene feature.

In some examples, the process 500 can determine the likelihood of a scene feature causing an error event based on a type of maneuver needed to handle/navigate the scene feature and any constraints that may prevent the AV 102 from handling/navigating the scene feature, as well as any constraints of the AV 102 and the capabilities of the AV 102. For example, the process 500 can determine the likelihood of a scene feature causing an error event by comparing the capabilities of the AV 102 with the type of maneuver needed to handle/navigate the scene feature in order to determine the probability that the capabilities of the AV 102 can handle/navigate the scene feature, and/or a comparison of one or more constraints of the AV 102 (e.g., routing constraints, steering constraints, speed constraints, maneuver constraints, minimum buffer distance restrictions, minimum obstacle distance restrictions, scene constraints, navigation constraints, etc.) with one or more constraints determined to prevent the AV 102 from handling/navigating the scene feature, in order to determine the probability that any constraints of the AV 102 may prevent the AV 102 from handling/navigating the scene feature. The process 500 can use the scene feature probabilities/likelihoods to determine error event likelihoods for route paths that include such scene features.

At block 530, the process 500 can determine, based on the respective likelihood that the AV will use each route path to traverse the route (e.g., as determined at block 510) and the respective error event likelihood of each route path (e.g., as determined at block 520), the aggregated error event likelihood associated with the route. For example, to determine an overall error event likelihood for a route path, the process 500 can combine or multiply the respective likelihood that the AV will use that route path to traverse the route and the respective error event likelihood calculated for that route path. The process 500 can then combine the overall error event likelihoods calculated for the route paths of the route to determine the aggregated error event likelihood of the route.

To illustrate, if route path A has an X likelihood of being used to traverse the route and a Y error event likelihood, the overall error event likelihood for the route path can be $(X)*(Y)$. In this way, the process 500 can calculate the overall error event likelihood of each route path and combine the overall error event rates of the route paths of the route to determine the aggregated error event likelihood of the route. For example, if the overall error event likelihood of route path A is X, the overall error event likelihood of route path B is Y, and the overall error event likelihood of route path C is Z, the aggregated error event likelihood of the route can be X+Y+Z.

Figure 6A:
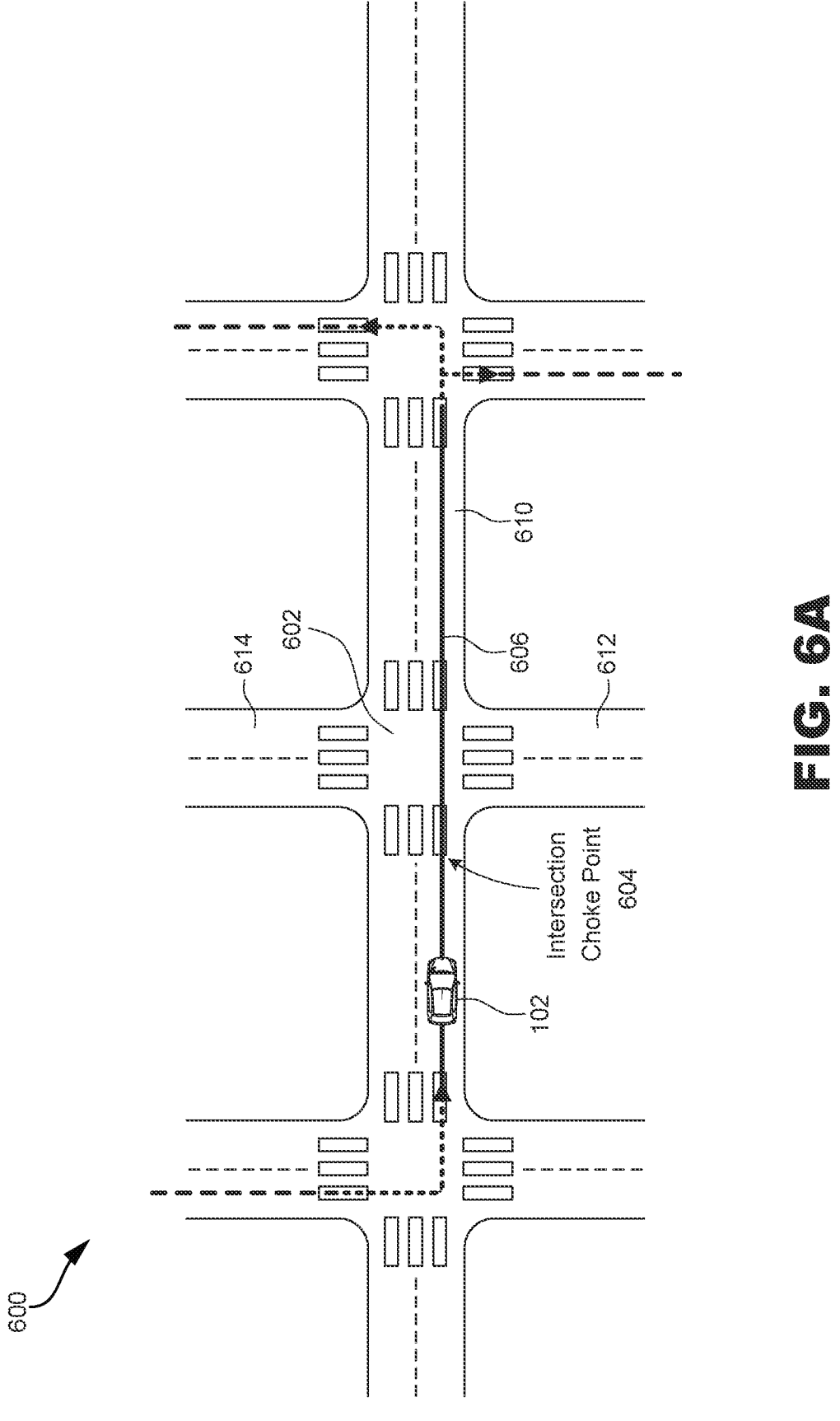
FIG. 6A is a diagram illustrating an example scene feature that includes an intersection choke point, according to some examples of the present disclosure.
Figure 6B:
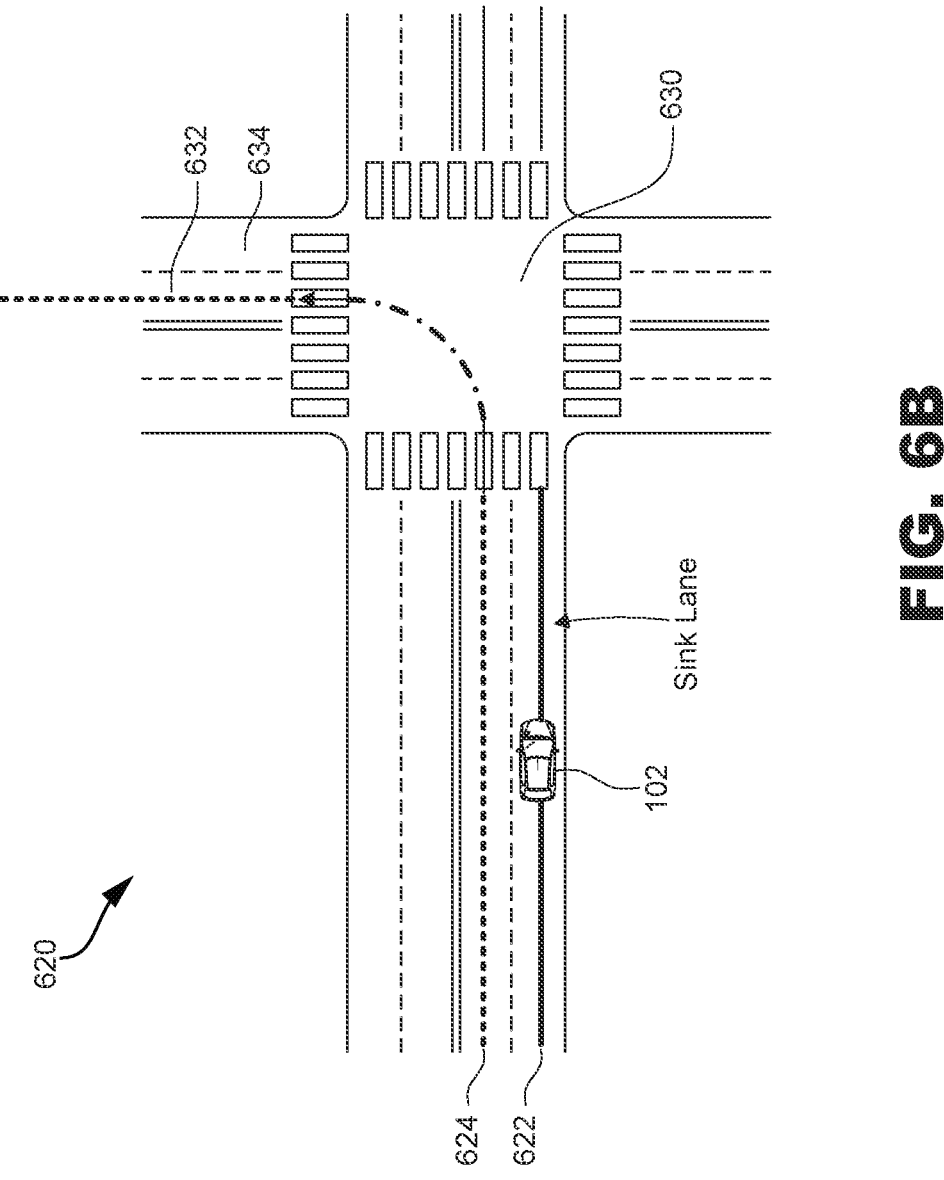
FIG. 6B is a diagram illustrating an example scene feature that includes a sink lane, according to some examples of the present disclosure.

As previously noted, certain scene features can have a higher likelihood of causing an error event than other features. For example, scene features that provide an AV less options for autonomously navigating or maneuvering the scene features than a human driver may have an increased likelihood of causing an error event. Moreover, scene features that require certain maneuvers or have certain constraints may increase the likelihood of causing an error event for an AV. FIGS. 6A and 6B illustrate some example features that can have a likelihood of causing an error event for an AV.

FIG. 6A is a diagram illustrating an example scene 600 with an intersection choke point 604. The intersection choke point 604 in this example can represent an example scene feature determined to have a threshold likelihood of causing an error event for an AV. The intersection choke point 604 can refer to an intersection where the AV 102 has less maneuver options (or only one maneuver option) for navigating the intersection, such as less turns that the AV can make at the intersection (or only one turn) or less directions (or only one direction) that the AV can travel when encountering the intersection, while a human driver has more maneuver options for navigating the intersection. In other words, the intersection choke point 604 can include a lane connected to an intersection that has multiple successor intersection lanes that are routable given the traffic rules of the intersection/scene, but not all of the multiple successor intersection lanes (or only one) is routable by an AV given the lane graph of the intersection/scene in the ODD of the AV.

In FIG. 6A, the AV 102 is traveling in a forward path 606 along a lane 610 in the scene 600, and approaching an intersection 602. In this example, the AV 102 has certain restrictions/constraints that do not allow the AV 102 to turn right at the intersection 602 onto lane 612 or turn left at the intersection 602 onto lane 614. Instead, when encountering the intersection 602, the AV 102 can only continue in the forward path 606 along the lane 610. However, a human driver does not have such restrictions/constraints. For example, when encountering the intersection 602, a human driver would be able to continue in the forward path 606 along the lane 610, turn right at the intersection 602 onto lane 612, or turn left at the intersection 602 onto lane 614.

Because the AV 102 has less maneuver/navigation options at the intersection 602 than a human driver (e.g., the AV 102 can only continue in the forward path 606 along the lane 610 unlike the human driver who can also turn right onto lane 612 or left onto lane 614), the intersection 602 includes or represents an intersection choke point 604. The intersection choke point 604 can have a threshold likelihood of causing an error event for the AV 102 because the AV 102 has less maneuver/navigation options at the intersection 602 than a human driver, and thus has a higher likelihood of experiencing an error event at the intersection choke point 604.

FIG. 6B is a diagram illustrating an example scene 620 with a sink lane. The sink lane in this example can represent an example scene feature determined to have a threshold likelihood of causing an error event for an AV. The sink lane can refer to a lane (e.g., lane 622) that can only be exited by making a lane change.

For example, in the scene 620, the AV 102 is traveling along the lane 622. The lane 622 does not allow the AV 102 to make a left turn at the intersection 630 onto lane 632 or lane 634. On the other hand, lane 624, which is adjacent to lane 622, does allow left turns at the intersection 630 onto lane 632 or lane 634. If the AV 102 needs to turn left at the intersection 630 onto lane 632 or lane 634, the AV 102 would first need to change from lane 622 to lane 624. The AV 102 would need to complete the lane change from lane 622 to lane 624 prior to reaching the intersection 630. Thus, because the AV 102 would be unable to turn left at the intersection 630 from the lane 622 and thus cannot exit the lane 622 at the intersection 630 without first making a lane change (to switch to lane 624), the lane 622 is a sink lane.

Moreover, because the lane 622 is a sink lane, if the AV 102 is unable to change from lane 622 to lane 624 prior to reaching the intersection 630, the AV 102 would be unable to turn left at the intersection 630 and exit the lane 622. Here, the AV 102 can experience an error event where the AV 102 needs to do a reroute, may become stuck at the intersection 630 in need of human assistance, or may otherwise trigger a request for human assistance. Thus, given the constraints of the sink lane (lane 622) and the potential for the AV 102 to experience an error event at the sink lane, the sink lane can be determined to have a threshold likelihood of causing an error event for the AV 102.

FIG. 6B illustrates one example type of sink lane. Other scenes may include other types of sink lanes. For example, a scene can include a sink superlane which can include a set of successive sink lanes that end in a terminal lane, which refers to a lane whose only successor(s) is/are accessible via a lane change(s). Another example type of sink lane can include cascaded sink superlanes. A cascaded sink superlane can include a sink superlane whose successor (via a lane change) is also a sink superlane.

FIG. 7 is a flowchart illustrating an example process 700 for determining error event likelihoods of routes and route paths. For example, the process 700 can be used to determine route paths for a route, error event likelihoods for the route paths, an aggregated error event likelihood for the route, error event likelihoods for various routes within a geofence (and/or ODD), and/or error event likelihoods for a geofence (and/or ODD).

At block 702, the process 700 can include determining a plurality of routes for an AV (e.g., AV 102). Each of the plurality of routes can be located within a geofence. In some cases, the plurality of routes can be determined based on a number of simulated trips (e.g., via simulation framework 200) within the geofence. In some examples, the plurality of routes can additionally or alternatively be determined based on the geofence, an ODD of the AV associated with the geofence, capabilities of the AV, any constraints of the AV, and/or scene features within the geofence. In some cases, the plurality of routes can be determined based on characteristics of the AV and/or previous trips within the geofence by the AV (and/or similar AVs).

At block 704, the process 700 can include determining, for each route from the plurality of routes, respective route paths from a starting location of the route to a destination location of the route. For example, in some cases, route paths of a route can be determined based on a number of simulated trips (e.g., via simulation framework 200) that include the route. In some examples, the route paths of a route can be determined based on the route, an ODD of the AV, capabilities of the AV, any constraints of the AV, and/or scene features within potential route paths and/or a region that includes the starting and destination locations of the route. In some cases, the route paths of a route can be determined based on characteristics of the AV and/or previous trips by the AV (and/or similar AVs) that include the route.

At block 706, the process 700 can include determining, for each route path of each route, a first respective likelihood that the AV will use the route path for a trip including the route. For example, if the respective set of route paths includes route path A, route path B, and route path C, the process 700 can determine a likelihood that the AV will use route path A for the route, a likelihood that the AV will use route path B for the route, and a likelihood that the AV will use route path C for the route.

If a route path overlaps with a different route path such that the AV would traverse the different route path before diverging into the route path, the process 700 can calculate the likelihood that the AV will use the route path based on a likelihood that the AV will traverse the overlapping portion of the different route path and diverge to the route path, as well as a likelihood that the AV will remain in the route path (e.g., rather than further diverging into another route path). For example, if route path B includes a portion of route path A and to use route path B the AV would traverse the portion of route path A and subsequently diverge (e.g., reroute/branch) to route path B, the process 700 can determine the likelihood that the AV will use route path B based on the combination of the likelihood that the AV will use the portion of route path A and diverge (e.g., reroute/branch) to route path B and the likelihood that the AV will remain in route path B after diverging into route path B from the portion of route path A.

At block 708, the process 700 can include determining, for each route path of each route, a second respective likelihood that the AV will encounter one or more error events along the route path during an autonomous operation of the AV. As previously noted, in some cases, the respective likelihood that the AV will encounter one or more error events along a route path can be determined based on one or more scene features along the route path. For example, the process 700 can identify one or more scene features along the route path that have a likelihood of causing an error event (e.g., merge lanes, intersection choke points, sink lanes, sink superlanes, cascaded sink superlanes, construction zones, intersections, etc.), and use the error event likelihoods associated with the one or more scene features along the route path to determine the respective likelihood that the AV will encounter one or more error events along the route path.

In some examples, each error event of the one or more error events can include an AV reroute, a failure to complete or perform an autonomous maneuver associated with a scene feature, an inability to continue the autonomous operation of the AV for at least a threshold period of time, and/or an inability to continue the autonomous operation of the AV without assistance from a human.

In some aspects, determining, for each route path of each route, the second respective likelihood that the AV will encounter the one or more error events along the route path can include determining, for each route path of each route and based on one or more scene features along the route path, an error event likelihood indicating a likelihood that the one or more scene features will cause an error event for the AV if the AV encounters the one or more scene features during the autonomous operation of the AV; and determining, for each route path of each route, the second respective likelihood that the AV will encounter the one or more error events along the route path based on the error event likelihood of each route path. In some aspects, the process 700 can include determining the likelihood that the one or more scene features will cause the error event for the AV.

In some examples, the likelihood can be determined based on a simulated AV trip including the one or more scene features and/or a previous trip of the AV along one or more routes comprising the one or more scene features. In other examples, the likelihood can additionally or alternatively be determined based on an autonomous capability of the AV, one or more maneuvers associated with the one or more scene features, and/or one or more operating constraints set in a software of the AV. In some aspects, the autonomous capability of the AV can include a maneuver capability, a software capability, a navigation or routing capability, a sensing or perception capability, and/or a mechanical capability. In some aspects, the one or more operating constraints can include a software constraint, a routing restriction, a lane change restriction, a merge restriction, an operating restriction associated with one or more types of scenes, and/or a maneuver restriction.

In some aspects, determining, for each route path of each route, the second respective likelihood that the AV will encounter the one or more error events along the route path can include determining, for each route path of each route, an estimated likelihood that the AV will use the route path for the trip including the route; and determining, for each route path of each route, the second respective likelihood that the AV will encounter the one or more error events along the route path based on a combination of the error event likelihood of each route path and the estimated likelihood for each route path of each route.

At block 710, the process 700 can include determining, for each route path of each route, an overall error event likelihood based on the first respective likelihood and the second respective likelihood determined for each route path of the route. For example, the process 700 can determine the overall error event likelihood for a route path by combining or multiplying the likelihood that the AV will use that route path for the route (e.g., the first respective likelihood) with the likelihood that the AV will encounter an error event along that route path (e.g., the second respective likelihood). In this way, the process 700 can determine the overall error event rate for all the route paths of a route, and can do so for every route from the plurality of routes.

At block 712, the process 700 can include determining an aggregated error event likelihood for each route based on the overall error event likelihood of each route path of that route. For example, the process 700 can combine or add the overall error event likelihood of each route path of a route to determine the aggregated error event likelihood for the route (e.g., including the route paths associated with the route). In this way, the process 700 can calculate the aggregated error event likelihood for each route from the plurality of routes within the geofence.

In some cases, the aggregated error event likelihood for each route can be used to determine an error event likelihood for the geofence (and/or an ODD associated with the geofence). For example, the process 700 can include determining an error event likelihood for the geofence based on the aggregated error event likelihood for each route. In some aspects, the process 700 can include determining an impact on the error event likelihood of the geofence by a software modification to the AV, a change in a sensing capability of the AV, a change to one or more constraints of the AV, a change to one or more parameters of an ODD associated with the geofence, and/or a change to one or more autonomous capabilities of the AV.

In some aspects, the process 700 can include determining, for each route path of each route, a number of scene features in each route path predicted to cause an error event for the AV during the autonomous operation of the AV; determining a respective number of error events of each route path of each route based on the number of scene features in each route path predicted to cause the error event for the AV during the autonomous operation of the AV; and determining an error event rate of each route path of each route based on the respective number of error events of each route path and a respective distance of each route path. In some examples, the error event can include an AV reroute, a failure to complete or perform an autonomous maneuver, an inability to continue the autonomous operation of the AV for at least a threshold period of time, and/or an inability to continue the autonomous operation of the AV without assistance from a human.

Figure 8:
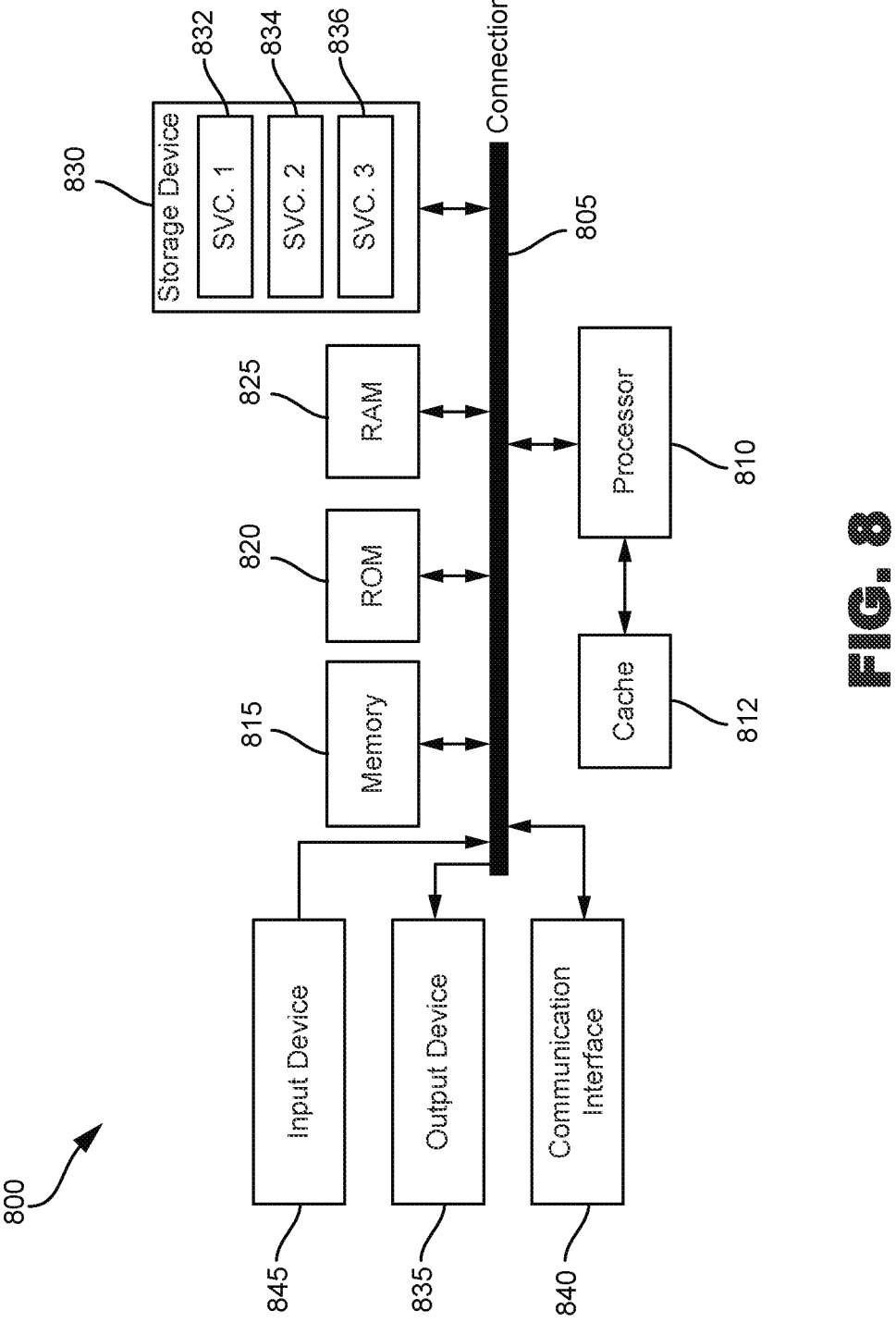
FIG. 8 is a diagram illustrating an example system architecture for implementing certain aspects described herein.

FIG. 8 illustrates an example processor-based system with which some aspects of the subject technology can be implemented. For example, processor-based system 800 can be any computing device making up local computing device 110, remote computing system 190, a passenger device (e.g., client computing device 170) executing the ridesharing application 172, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some examples, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random-access memory (RAM) 825 to processor 810. Computing system 800 can include a cache of high-speed memory 812 connected directly with, in close proximity to, and/or integrated as part of processor 810.

Processor 810 can include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 can include an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L#), resistive random-access memory (RRAM/ReRAM), phase change memory (PCM), spin transfer torque RAM (STT-RAM), another memory chip or cartridge, and/or a combination thereof.

Storage device 830 can include software services, servers, services, etc., that when the code that defines such software is executed by the processor 810, causes the system to perform a function. In some examples, a hardware service that performs a particular function can include the software component stored in a computer-readable medium in connection with the necessary hardware components, such as processor 810, connection 805, output device 835, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the example aspects and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A system comprising: a memory; and one or more processors coupled to the memory, the one or more processors being configured to: determine, for each route from a plurality of routes for an autonomous vehicle (AV), respective route paths from a starting location of the route to a destination location of the route, wherein each of the plurality of routes is located within a geofence; determine, for each route path of each route, a first respective likelihood that the AV will use the route path for a trip comprising the route; determine, for each route path of each route, a second respective likelihood that the AV will encounter one or more error events along the route path during an autonomous operation of the AV; determine, for each route path of each route, an overall error event likelihood based on the first respective likelihood and the second respective likelihood determined for each route path of the route; and determine an aggregated error event likelihood for each route based on the overall error event likelihood of each route path of the route.

Aspect 2. The system of Aspect 1, wherein each error event of the one or more error events comprises at least one of an AV reroute, a failure to complete or perform an autonomous maneuver associated with a scene feature, an inability to continue the autonomous operation of the AV for at least a threshold period of time, and an inability to continue the autonomous operation of the AV without assistance from a human.

Aspect 3. The system of any of Aspects 1 to 2, wherein determining, for each route path of each route, the second respective likelihood that the AV will encounter the one or more error events along the route path comprises: for each route path of each route, determining, based on one or more scene features along the route path, an error event likelihood indicating a likelihood that the one or more scene features will cause an error event for the AV if the AV encounters the one or more scene features during the autonomous operation of the AV; and determining, for each route path of each route, the second respective likelihood that the AV will encounter the one or more error events along the route path based on the error event likelihood of each route path.

Aspect 4. The system of Aspect 3, wherein determining, for each route path of each route, the second respective likelihood that the AV will encounter the one or more error events along the route path further comprises: determining, for each route path of each route, an estimated likelihood that the AV will use the route path for the trip comprising the route; and determining, for each route path of each route, the second respective likelihood that the AV will encounter the one or more error events along the route path based on a combination of the error event likelihood of each route path and the estimated likelihood for each route path of each respective set of route paths of each route.

Aspect 5. The system of any of Aspects 3 to 4, wherein the one or more processors are configured to: determine the likelihood that the one or more scene features will cause the error event for the AV, the likelihood being determined based on at least one of a simulated AV trip including the one or more scene features and a previous trip of the AV along one or more routes comprising the one or more scene features.

Aspect 6. The system of any of Aspects 3 to 5, wherein the one or more processors are configured to: determine the likelihood that the one or more scene features will cause the error event for the AV, the likelihood being determined based on at least one of an autonomous capability of the AV, one or more maneuvers associated with the one or more scene features, and one or more operating constraints set in a software of the AV.

Aspect 7. The system of Aspect 6, wherein the autonomous capability of the AV comprises at least one of a maneuver capability, a software capability, a navigation or routing capability, a sensing or perception capability, and a mechanical capability, wherein the one or more operating constraints comprise at least one of a software constraint, a routing restriction, a lane change restriction, a merge restriction, an operating restriction associated with one or more types of scenes, and a maneuver restriction.

Aspect 8. The system of any of Aspects 1 to 7, wherein the one or more processors are configured to: determine, for each route path of each route, a number of scene features in each route path predicted to cause an error event for the AV during the autonomous operation of the AV, wherein the error event comprises at least one of an AV reroute, a failure to complete or perform an autonomous maneuver, an inability to continue the autonomous operation of the AV for at least a threshold period of time, and an inability to continue the autonomous operation of the AV without assistance from a human; determine a respective number of error events of each route path of each route based on the number of scene features in each route path predicted to cause the error event for the AV during the autonomous operation of the AV; and determine an error event rate of each route path of each route based on the respective number of error events of each route path and a respective distance of each route path.

Aspect 9. The system of any of Aspects 1 to 8, wherein the one or more processors are configured to: determine an error event likelihood for the geofence based on the aggregated error event likelihood for each route.

Aspect 10. The system of Aspect 9, wherein the one or more processors are configured to: determine an impact on the error event likelihood of the geofence by at least one of a software modification to the AV, a change in a sensing capability of the AV, a change to one or more constraints of the AV, a change to one or more parameters of an operating design domain (ODD) associated with the geofence, and a change to one or more autonomous capabilities of the AV.

Aspect 11. A method comprising: determining, for each route from a plurality of routes for an autonomous vehicle (AV), respective route paths from a starting location of the route to a destination location of the route, wherein each of the plurality of routes is located within a geofence; determining, for each route path of each route, a first respective likelihood that the AV will use the route path for a trip comprising the route; determining, for each route path of each route, a second respective likelihood that the AV will encounter one or more error events along the route path during an autonomous operation of the AV; determining, for each route path of each route, an overall error event likelihood based on the first respective likelihood and the second respective likelihood determined for each route path of each respective set of route paths of that route; and determining an aggregated error event likelihood for each route based on the overall error event likelihood of each route path of that route.

Aspect 12. The method of Aspect 11, wherein each error event of the one or more error events comprises at least one of an AV reroute, a failure to complete or perform an autonomous maneuver associated with a scene feature, an inability to continue the autonomous operation of the AV for at least a threshold period of time, and an inability to continue the autonomous operation of the AV without assistance from a human.

Aspect 13. The method of any of Aspects 11 to 12, wherein determining, for each route path of each route, the second respective likelihood that the AV will encounter the one or more error events along the route path comprises: for each route path of each route, determining, based on one or more scene features along the route path, an error event likelihood indicating a likelihood that the one or more scene features will cause an error event for the AV if the AV encounters the one or more scene features during the autonomous operation of the AV; and determining, for each route path of each route, the second respective likelihood that the AV will encounter the one or more error events along the route path based on the error event likelihood of each route path.

Aspect 14. The method of Aspect 13, wherein determining, for each route path of each route, the second respective likelihood that the AV will encounter the one or more error events along the route path further comprises: determining, for each route path of each route, an estimated likelihood that the AV will use the route path for the trip comprising the route; and determining, for each route path of each route, the second respective likelihood that the AV will encounter the one or more error events along the route path based on a combination of the error event likelihood of each route path and the estimated likelihood for each route path of each respective set of route paths of each route.

Aspect 15. The method of any of Aspects 13 to 14, further comprising: determining the likelihood that the one or more scene features will cause the error event for the AV, the likelihood being determined based on at least one of a simulated AV trip including the one or more scene features and a previous trip of the AV along one or more routes comprising the one or more scene features.

Aspect 16. The method of any of Aspects 13 to 15, further comprising: determining the likelihood that the one or more scene features will cause the error event for the AV, the likelihood being determined based on at least one of an autonomous capability of the AV, one or more maneuvers associated with the one or more scene features, and one or more operating constraints set in a software of the AV, wherein the autonomous capability of the AV comprises at least one of a maneuver capability, a software capability, a navigation or routing capability, a sensing or perception capability, and a mechanical capability, wherein the one or more operating constraints comprise at least one of a software constraint, a routing restriction, a lane change restriction, a merge restriction, an operating restriction associated with one or more types of scenes, and a maneuver restriction.

Aspect 17. The method of any of Aspects 11 to 16, further comprising: determining, for each route path of each route, a number of scene features in each route path predicted to cause an error event for the AV during the autonomous operation of the AV, wherein the error event comprises at least one of an AV reroute, a failure to complete or perform an autonomous maneuver, an inability to continue the autonomous operation of the AV for at least a threshold period of time, and an inability to continue the autonomous operation of the AV without assistance from a human; determining a respective number of error events of each route path of each route based on the number of scene features in each route path predicted to cause the error event for the AV during the autonomous operation of the AV; and determining an error event rate of each route path of each route based on the respective number of error events of each route path and a respective distance of each route path.

Aspect 18. The method of any of Aspects 11 to 17, further comprising: determining an error event likelihood for the geofence based on the aggregated error event likelihood for each route.

Aspect 19. The method of Aspect 18, further comprising: determining an impact on the error event likelihood of the geofence by at least one of a software modification to the AV, a change in a sensing capability of the AV, a change to one or more constraints of the AV, a change to one or more parameters of an operating design domain (ODD) associated with the geofence, and a change to one or more autonomous capabilities of the AV.

Aspect 20. A non-transitory computer-readable medium comprising instructions which, when executed by one or more processors, cause the one or more processors to perform a method according to any of Aspects 11 to 19.

Aspect 21. An autonomous vehicle comprising a computing device configured to perform a method according to any of Aspects 11 to 19.

Aspect 22. A system comprising means for performing a method according to any of Aspects 11 to 19.

Aspect 23. A computer-program product comprising instructions which, when executed by one or more processors, cause the one or more processors to perform a method according to any of Aspects 11 to 19.

What is claimed is:

1. A system for managing an autonomous vehicle (AV) comprising:

a memory; and one or more processors coupled to the memory, the memory storing instructions that define a simulation framework configured to generate simulations of the AV using models of its real-world operation within a model of a real-world geofenced operational design domain (ODD), wherein the one or more processors are configured to:

generate a plurality of simulated routes for autonomous operation of the AV located within the ODD from a starting location to a destination location;

determine, for each simulated route from the plurality of simulated routes, respective route paths from the starting location of the route to the destination location of the route;

determine, for each route path of each simulated route, a first respective likelihood that the AV will use the route path for an AV trip comprising the route;

determine, for each route path of each simulated route, a second respective likelihood that the AV will encounter one or more error events along the route path during the AV trip;

determine, for each route path of each simulated route, an overall error event likelihood based on the first respective likelihood and the second respective likelihood determined for each route path of the simulated route;

determine an aggregated error event likelihood for each simulated route based on the overall error event likelihood of each route path of the simulated route;

determine an error event likelihood for the geofence based on the aggregated error event likelihood for each simulated route; and determine an impact on the error event likelihood of the geofence by a simulation of at least one of a proposed change to a software of the AV, a sensing capability of the AV, one or more constraints of the AV, one or more parameters of an operating design domain (ODD) associated with the geofence, and one or more autonomous capabilities of the AV; and operate the systems of the AV based in part on the impact on the error event likelihood.

2. The system of claim 1, wherein each error event of the one or more error events comprises at least one of an AV reroute, a failure to complete or perform an autonomous maneuver associated with a scene feature, an inability to continue the autonomous operation of the AV for at least a threshold period of time, and an inability to continue the autonomous operation of the AV without assistance from a human.

3. The system of claim 1, wherein determining, for each route path of each route, the second respective likelihood that the AV will encounter the one or more error events along the route path comprises:

for each route path of each route, determining, based on one or more scene features along the route path, an error event likelihood indicating a likelihood that the one or more scene features will cause an error event for the AV if the AV encounters the one or more scene features during the autonomous operation of the AV; and determining, for each route path of each route, the second respective likelihood that the AV will encounter the one or more error events along the route path based on the error event likelihood of each route path.

4. The system of claim 3, wherein determining, for each route path of each route, the second respective likelihood that the AV will encounter the one or more error events along the route path further comprises:

determining, for each route path of each route, an estimated likelihood that the AV will use the route path for the trip comprising the route; and determining, for each route path of each route, the second respective likelihood that the AV will encounter the one or more error events along the route path based on a combination of the error event likelihood of each route path and the estimated likelihood for each route path of each respective set of route paths of each route.

5. The system of claim 3, wherein the one or more processors are configured to:

determine the likelihood that the one or more scene features will cause the error event for the AV, the likelihood being determined based on at least one of a simulated AV trip including the one or more scene features and a previous trip of the AV along one or more routes comprising the one or more scene features.

6. The system of claim 3, wherein the one or more processors are configured to:

determine the likelihood that the one or more scene features will cause the error event for the AV, the likelihood being determined based on at least one of an autonomous capability of the AV, one or more maneuvers associated with the one or more scene features, and one or more operating constraints set in a software of the AV.

7. The system of claim 6, wherein the autonomous capability of the AV comprises at least one of a maneuver capability, a software capability, a navigation or routing capability, a sensing or perception capability, and a mechanical capability, wherein the one or more operating constraints comprise at least one of a software constraint, a routing restriction, a lane change restriction, a merge restriction, an operating restriction associated with one or more types of scenes, and a maneuver restriction.

8. The system of claim 1, wherein the one or more processors are configured to: determine, for each route path of each route, a number of scene features in each route path predicted to cause an error event for the AV during the autonomous operation of the AV, wherein the error event comprises at least one of an AV reroute, a failure to complete or perform an autonomous maneuver, an inability to continue the autonomous operation of the AV for at least a threshold period of time, and an inability to continue the autonomous operation of the AV without assistance from a human;

determine a respective number of error events of each route path of each route based on the number of scene features in each route path predicted to cause the error event for the AV during the autonomous operation of the AV; and determine an error event rate of each route path of each route based on the respective number of error events of each route path and a respective distance of each route path.

9. The system of claim 1, wherein the one or more processors are configured to: determine whether to implement the proposed change to the software of the AV, the sensing capability of the AV, the one or more constraints of the AV, the one or more parameters of the ODD, and the one or more autonomous capabilities of the AV based on the impact the simulation of the proposed change has on the error event likelihood of the geofence.

10. A method for operating an autonomous vehicle (AV) comprising:

determining, via one or more processors coupled to a memory storing instructions for execution by the one or more processors, the instructions defining a simulation framework configured to generate simulations of the AV using models of its real-world operation within a model of a real-world geofenced operational design domain (ODD), wherein the one or more processors generate a plurality of simulated routes for autonomous operation of the AV located within the ODD;

determining, for each simulated route from the plurality of simulated routes, respective route paths from a starting location of the route to a destination location of the route;

determining, for each simulated route path of each route, a first respective likelihood that the AV will use the route path for an AV trip comprising the route;

determining, for each route path of each simulated route, a second respective likelihood that the AV will encounter one or more error events along the route path during the AV trip;

determining, for each route path of each simulated route, an overall error event likelihood based on the first respective likelihood and the second respective likelihood determined for each route path of each respective set of route paths of that simulated route; and determining an aggregated error event likelihood for each simulated route based on the overall error event likelihood of each route path of that simulated route;

determining an error event likelihood for the geofence based on the aggregated error event likelihood for each simulated route; and determining an impact on the error event likelihood of the geofence by a simulation of at least one of a proposed change to a software of the AV, a sensing capability of the AV, one or more constraints of the AV, one or more parameters of an operating design domain (ODD) associated with the geofence, and one or more autonomous capabilities of the AV; and operating the systems of the AV based at least in part on the impact on the error event likelihood.

11. The method of claim 10, wherein each error event of the one or more error events comprises at least one of an AV reroute, a failure to complete or perform an autonomous maneuver associated with a scene feature, an inability to continue the autonomous operation of the AV for at least a threshold period of time, and an inability to continue the autonomous operation of the AV without assistance from a human.

12. The method of claim 10, wherein determining, for each route path of each route, the second respective likelihood that the AV will encounter the one or more error events along the route path comprises:

for each route path of each route, determining, based on one or more scene features along the route path, an error event likelihood indicating a likelihood that the one or more scene features will cause an error event for the AV if the AV encounters the one or more scene features during the autonomous operation of the AV; and determining, for each route path of each route, the second respective likelihood that the AV will encounter the one or more error events along the route path based on the error event likelihood of each route path.

13. The method of claim 12, wherein determining, for each route path of each route, the second respective likelihood that the AV will encounter the one or more error events along the route path further comprises:

determining, for each route path of each route, an estimated likelihood that the AV will use the route path for the trip comprising the route; and determining, for each route path of each route, the second respective likelihood that the AV will encounter the one or more error events along the route path based on a combination of the error event likelihood of each route path and the estimated likelihood for each route path of each respective set of route paths of each route.

14. The method of claim 12, further comprising:

determining the likelihood that the one or more scene features will cause the error event for the AV, the likelihood being determined based on at least one of a simulated AV trip including the one or more scene features and a previous trip of the AV along one or more routes comprising the one or more scene features.

15. The method of claim 12, further comprising:

determining the likelihood that the one or more scene features will cause the error event for the AV, the likelihood being determined based on at least one of an autonomous capability of the AV, one or more maneuvers associated with the one or more scene features, and one or more operating constraints set in a software of the AV, wherein the autonomous capability of the AV comprises at least one of a maneuver capability, a software capability, a navigation or routing capability, a sensing or perception capability, and a mechanical capability, wherein the one or more operating constraints comprise at least one of a software constraint, a routing restriction, a lane change restriction, a merge restriction, an operating restriction associated with one or more types of scenes, and a maneuver restriction.

16. The method of claim 10, further comprising:

determining, for each route path of each route, a number of scene features in each route path predicted to cause an error event for the AV during the autonomous operation of the AV, wherein the error event comprises at least one of an AV reroute, a failure to complete or perform an autonomous maneuver, an inability to continue the autonomous operation of the AV for at least a threshold period of time, and an inability to continue the autonomous operation of the AV without assistance from a human;

determining a respective number of error events of each route path of each route based on the number of scene features in each route path predicted to cause the error event for the AV during the autonomous operation of the AV; and determining an error event rate of each route path of each route based on the respective number of error events of each route path and a respective distance of each route path.

17. The method of claim 10, further comprising:

determining whether to implement the proposed change to the software of the AV, the sensing capability of the AV, the one or more constraints of the AV, the one or more parameters of the ODD, and the one or more autonomous capabilities of the AV based on the impact the simulation of the proposed change has on the error event likelihood of the geofence.

18. A non-transitory computer-readable medium comprising instructions which define a simulation framework configured to generate simulations of an autonomous vehicle (AV) using models of its real-world operation within a model of a real-world geofenced operational design domain (ODD) that, when executed by one or more processors, cause the one or more processors to:

determine a plurality of simulated routes for autonomous operation of the AV located within the ODD;

determine, for each simulated route from the plurality of routes, respective route paths from a starting location of the route to a destination location of the route;

determine, for each route path of each simulated route, a first respective likelihood that the AV will use the route path for an AV trip comprising the route;

determine, for each route path of each simulated route, a second respective likelihood that the AV will encounter one or more error events along the route path during the AV trip;

determine, for each route path of each simulated route, an overall error event likelihood based on the first respective likelihood and the second respective likelihood determined for each route path of each respective set of route paths of that simulated route; and determine an aggregated error event likelihood for each simulated route based on the overall error event likelihood of each route path of that simulated route;

determine an error event likelihood for the geofence based on the aggregated error event likelihood for each route;

determine an impact on the error event likelihood of the geofence by a simulation of at least one of a proposed change to a software of the AV, a sensing capability of the AV, one or more constraints of the AV, one or more parameters of an operating design domain (ODD) associated with the geofence, and one or more autonomous capabilities of the AV; and determine whether to implement the proposed change to the software of the AV, the sensing capability of the AV, the one or more constraints of the AV, the one or more parameters of the ODD, and the one or more autonomous capabilities of the AV based on the impact the simulation of the proposed change has on the error event likelihood of the geofence; and operate the systems of the AV based on whether the proposed change has been implemented to minimize the error event likelihood.

* * * * *